United States Patent
Stone

(10) Patent No.: US 9,367,947 B2
(45) Date of Patent: *Jun. 14, 2016

(54) REMOTE RENDERING OF THREE-DIMENSIONAL IMAGES USING VIRTUAL MACHINES

(71) Applicant: Citrix Systems, Inc., Ft. Lauderdale, FL (US)

(72) Inventor: David Stone, Lauderdale By-The-Sea, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/748,796

(22) Filed: Jun. 24, 2015

(65) Prior Publication Data
US 2015/0294494 A1 Oct. 15, 2015

Related U.S. Application Data

(63) Continuation of application No. 12/881,119, filed on Sep. 13, 2010, now Pat. No. 9,092,249.

(60) Provisional application No. 61/241,420, filed on Sep. 11, 2009.

(51) Int. Cl.
*G06T 15/00* (2011.01)
*G06F 21/53* (2013.01)
*G06F 9/455* (2006.01)

(52) U.S. Cl.
CPC .......... *G06T 15/005* (2013.01); *G06F 9/45541* (2013.01); *G06T 15/00* (2013.01)

(58) Field of Classification Search
None
See application file for complete search history.

(56) References Cited

U.S. PATENT DOCUMENTS

| 8,200,796 B1 | 6/2012 | Margulis |
| 2006/0146057 A1 | 7/2006 | Blythe |
| 2009/0102838 A1 | 4/2009 | Bullard et al. |
| 2010/0013839 A1 | 1/2010 | Rawson |

(Continued)

OTHER PUBLICATIONS

Dowty M. et al., GPU Virtualization on VMware's Hosted I/O Architecture, Operating Systems Review (ACM), vol. 43, No. 3, Jul. 31, 2009, pp. 73-82, XP002611884.

(Continued)

*Primary Examiner* — Andrew G Yang
(74) *Attorney, Agent, or Firm* — Foley & Lardner LLP; John D. Lanza

(57) ABSTRACT

Remote rendering of three-dimensional images using virtual machines includes using a hypervisor executing on a physical computer to allocate exclusive and direct access to a graphics processing unit in the physical computer, to a first virtual machine. An agent executing on a second virtual machine intercepts three-dimensional draw commands generated by a three-dimensional application and forwards the intercepted draw commands to a rendering agent executing on the first virtual machine. The rendering agent then transmits the intercepted draw commands to the graphics processing unit for rendering upon which the graphics processing unit renders a three-dimensional image from the draw commands. The rendering agent obtains the rendered image from the graphics processing unit and forwards the image to the second virtual machine. Upon receiving the rendered image, the second virtual machine transmits the rendered image to another remote, physical computer where the rendered image is displayed to a user.

20 Claims, 10 Drawing Sheets

(56) References Cited

U.S. PATENT DOCUMENTS

2010/0138744 A1    6/2010   Kamay et al.
2011/0050712 A1    3/2011   Jackson

OTHER PUBLICATIONS

International Preliminary Report on Patentability for PCT/US2010/048682 dated Mar. 22, 2012 (CTX-410PC).

International Search Report for PCT/US2010/048682 dated Dec. 21, 2010 (CTX-410PC).

Lagar-Vailla, et al., "VMM-Independent Graphics Acceleration", Proceedings of the 3rd International Conference on Virtual Execution Environments., Jun. 13-15, 2007 pp. 33-43, XP007907183.

Notice of Allowance on U.S. Appl. No. 12/881,119 dated Mar. 25, 2015 (CTX-410US).

Office Action U.S. Appl. No. 12/881,119 dated Nov. 26, 2014 (CTX-410US).

Office Action on U.S. Appl. No. 12/881,119 dated Dec. 16, 2013 (CTX-410US).

Office Action on U.S. Appl. No. 12/881,119 dated Jun. 10, 2014 (CTX-410US).

Office Action on U.S. Appl. No. 12/881,119 dated Jul. 8, 2013 (CTX-410US).

Written Opinion for PCT/US2010/048682 dated Dec. 21, 2010 (CTX-410PC).

REMOTE RENDERING OF THREE-DIMENSIONAL IMAGES USING VIRTUAL MACHINES

RELATED APPLICATION

This application claims priority to and is a continuation of U.S. patent application Ser. No. 12/881,119, titled "Remote Rendering of Three-Dimensional Images Using Virtual Machines" filed on Sep. 13, 2010 which claims priority to and the benefit of the U.S. provisional Patent application No. 61/241,420 titled "Methods and Systems for Managing Access, by Virtual Machines, to a Graphics Processing Unit" filed Sep. 11, 2009, which are both incorporated herein by reference in their entirety.

FIELD OF THE DISCLOSURE

This application generally relates to rendering graphics using a graphics processing unit. In particular, this application relates to remote rendering of three-dimensional images in a virtualization environment.

BACKGROUND OF THE DISCLOSURE

In many instances, hypervisors allow multiple operating systems executed by virtual machines to run simultaneously on the same physical hardware. These hypervisors can execute on top of an operating system, or can execute directly on the physical hardware of a computer (e.g. bare-metal hypervisors.) In some instances a virtual machine can execute a paravirtualized operating system or a non-paravirtualized operating system. Paravirtualized operating systems are typically operating systems that have been modified to execute within a virtualized environment, e.g. the LINUX operating system, and can access hardware components directly. Non-Paravirtualized operating systems are typically operating systems that have not been modified to execute within a virtualized environment, e.g. the WINDOWS operating system, and cannot access hardware components directly.

Rendering three-dimensional graphics typically requires a great deal of resources and in many embodiments requires directly accessing a graphics processing unit (GPU). In virtualized environments where multiple virtual machines may require access to the graphics processing unit at any one time, the GPU is virtualized by the hypervisor and access to the virtualized GPU may be managed by a control program. Three-dimensional applications that require rendering three-dimensional graphics, typically underperform in such virtualized environments because the three-dimensional applications are not provided with direct and exclusive access to the GPU. Non-paravirtualized operating systems typically require applications generating three-dimensional drawing commands to access a GPU through a set of interfaces and drivers. Thus, users of the three-dimensional application may experience significant delay in the rendering of three-dimensional images because the three-dimensional application does not have direct access to the GPU.

Virtualizing the GPU can be one solution for overcoming the problems associated with executing three-dimensional applications within the context of a non-paravirtualized operating system. While the virtualized GPU allows virtual machines to share access to a physical GPU, the virtual GPU does little to ensure that three-dimensional applications have exclusive access to the physical GPU or to remedy the direct access problems posed by the non-paravirtualized operating systems. Further, implementing a virtual GPU often requires the installation and execution of a virtual GPU designed for the provided physical GPU.

There exist technologies that remedy the problems associated with rendering three-dimensional graphics in a virtualized environment. These technologies, however, often function for only a select few three-dimensional graphics libraries, e.g. OpenGL. For other three-dimensional graphics libraries, e.g. Direct3D, no such technology exists. Furthermore, many of the technologies are only compatible with paravirtualized operating systems and not with non-paravirtualized operating systems.

There exist other technologies that remedy the problems associated with rendering three-dimensional graphics in a virtualized environment by transmitting three-dimensional graphics commands to a remote computer able to render the graphics. This remote computer can in some instances provided the direct GPU access required to quickly and efficiently render the three-dimensional images. Upon rendering the graphics, the remote computer can transmit the rendered graphics back to the virtual machine executing the three-dimensional application. Still other technologies provide a software graphics driver that provides access to a subset of the functionality provided by an available graphics processing units. Each of these solutions fails to leverage the functionality of the physical GPU and may introduce latency into the graphics processing process.

SUMMARY OF THE DISCLOSURE

In one aspect, described herein are methods and systems for remotely rendering three-dimensional drawing commands generated by three-dimensional applications executed by virtual machines executing non-paravirtualized operating systems. A hypervisor executing on a first physical computer executes a first virtual machine and a second virtual machine. The hypervisor allocates direct access to a graphics processing unit of the first physical computer to a non-paravirtualized operating system executing on the first virtual machine. An agent executing on the second virtual machine intercepts three-dimensional draw commands generated by a three-dimensional application that executes on the second virtual machine. The intercepted three-dimensional draw commands are redirected to a rendering agent that executes on the first virtual machine. A graphics processing unit then renders an image from the three-dimensional draw commands in response to receiving the three-dimensional draw commands from the rendering agent. In response to receiving the rendered image from the graphics processing unit, the rendering agent forwards the rendered image to the agent executing on the second virtual machine. In response to receiving the rendered image, the second virtual machine transmits the rendered image to a second physical computer over a communication channel established between the first physical computer and the second physical computer.

In some embodiments, the second virtual machine executes a non-paravirtualized operating system. In other embodiments, a remoting agent executing on the second virtual machine transmits the rendered image to the second physical computer.

In other embodiments the rendering agent transmits the three-dimensional draw commands to the graphics processing unit of the first physical computer in response to receiving the three-dimensional draw commands from the second virtual machine. In still other embodiments, the rendering agent transmit an instruction to render the three-dimensional draw commands along with the three-dimensional draw commands.

The second virtual machine, in some embodiments, receives a request from an application executing on the second physical computer for application output generated by the three-dimensional application executing on the second virtual machine. In some embodiments, the rendered image is transmitted to the second physical computer in response to receiving the application output request from the second physical computer.

The hypervisor, in some embodiments, allocates direct access to the graphics processing unit to the first virtual machine by preventing the second virtual machine from accessing the graphics processing unit.

The second virtual machine, in some embodiments, requests access to the graphics processing unit upon intercepting the three-dimensional draw commands. The agent executing on the second virtual machine then redirects the intercepted three-dimensional draw commands to the first virtual machine in response to receiving a notification from the hypervisor denying the second virtual machine access to the graphics processing unit.

BRIEF DESCRIPTION OF THE DRAWINGS

The following figures depict certain illustrative embodiments of the methods and systems described herein, in which like reference numerals refer to like elements. These depicted embodiments are to be understood as illustrative of the disclosed methods and systems and not as limiting in any way.

DETAILED DESCRIPTION OF THE DRAWINGS

Figure 1A:
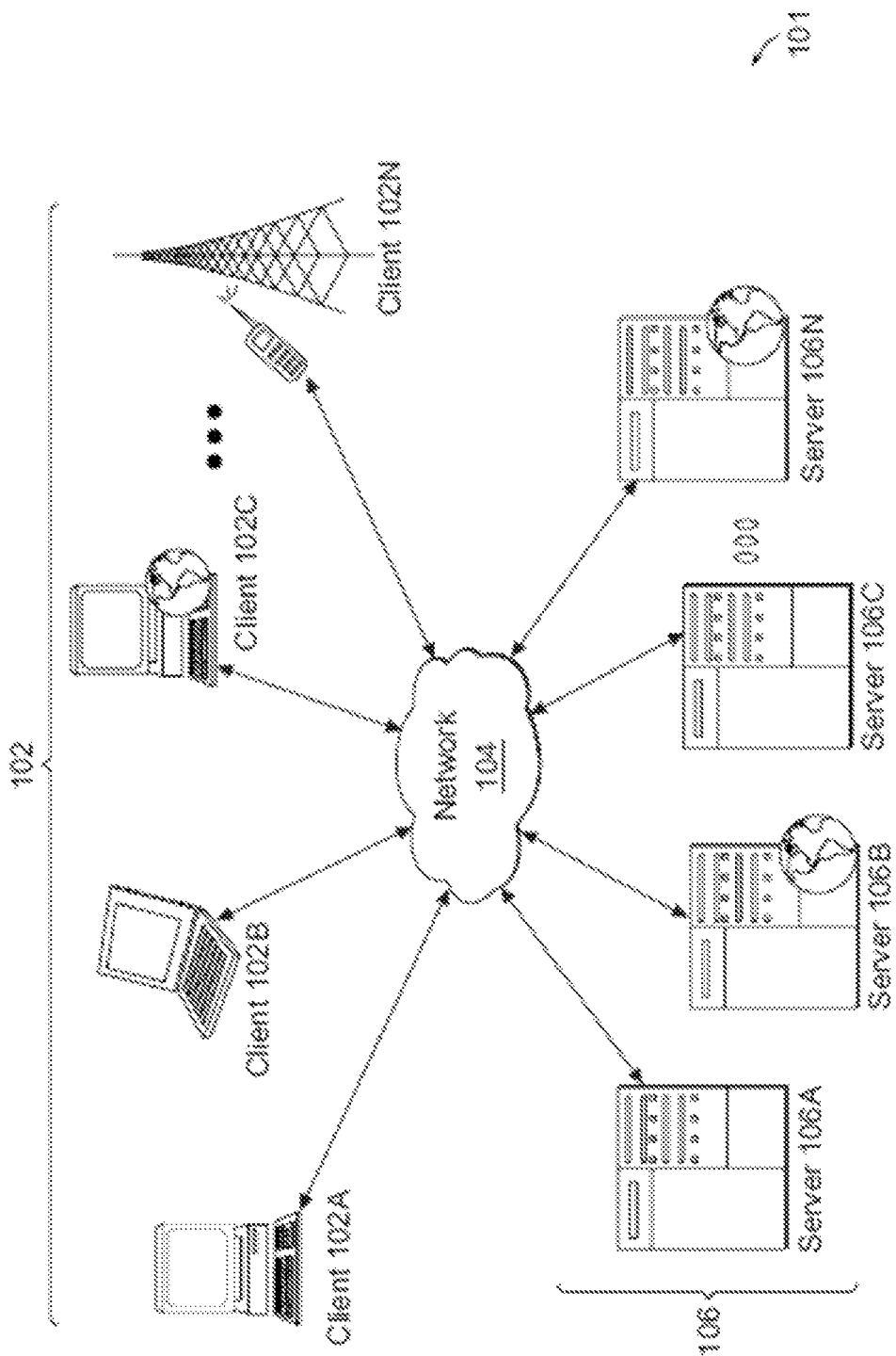
FIG. 1A depicts embodiments of network environments that provide remote access to computing devices that can execute application programs.

FIG. 1A illustrates one embodiment of a computing environment 101 that includes one or more client machines 102A-102N (generally referred to herein as "client machine(s) 102") that are in communication with one or more servers 106A-106N (generally referred to herein as "server(s) 106"). Installed in between the client machine(s) 102 and server(s) 106 is a network.

In one embodiment, the computing environment 101 can include an appliance installed between the server(s) 106 and client machine(s) 102. This appliance can mange client/server connections, and in some cases can load balance client connections amongst a plurality of backend servers.

The client machine(s) 102 can in some embodiment be referred to as a single client machine 102 or a single group of client machines 102, while server(s) 106 may be referred to as a single server 106 or a single group of servers 106. In one embodiment a single client machine 102 communicates with more than one server 106, while in another embodiment a single server 106 communicates with more than one client machine 102. In yet another embodiment, a single client machine 102 communicates with a single server 106.

A client machine 102 can, in some embodiments, be referenced by any one of the following terms: client machine(s) 102; client(s); client computer(s); client device(s); client computing device(s); local machine; remote machine; client node(s); endpoint(s); endpoint node(s); or a second machine. The server 106, in some embodiments, may be referenced by any one of the following terms: server(s), local machine; remote machine; server farm(s), host computing device(s), or a first machine(s).

In one embodiment, the client machine 102 can be a virtual machine 102C. The virtual machine 102C can be any virtual machine, while in some embodiments the virtual machine 102C can be any virtual machine managed by a hypervisor developed by XenSolutions, Citrix Systems, IBM, VMware, or any other hypervisor. In other embodiments, the virtual machine 102C can be managed by any hypervisor, while in still other embodiments, the virtual machine 102C can be managed by a hypervisor executing on a server 106 or a hypervisor executing on a client 102.

The client machine 102 can in some embodiments execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions. Still other embodiments include a client device 102 that displays application output generated by an application remotely executing on a server 106 or other remotely located machine. In these embodiments, the client device 102 can display the application output in an application window, a browser, or other output window. In one embodiment, the application is a desktop, while in other embodiments the application is an application that generates a desktop.

The server 106, in some embodiments, executes a remote presentation client or other client or program that uses a thin-client or remote-display protocol to capture display output generated by an application executing on a server 106 and transmits the application display output to a remote client 102. The thin-client or remote-display protocol can be any one of the following protocols: the Independent Computing Architecture (ICA) protocol manufactured by Citrix Systems, Inc. of Ft. Lauderdale, Fla.; or the Remote Desktop Protocol (RDP) manufactured by the Microsoft Corporation of Redmond, Wash.

The computing environment can include more than one server 106A-106N such that the servers 106A-106N are logically grouped together into a server farm 106. The server farm 106 can include servers 106 that are geographically dispersed and logically grouped together in a server farm 106, or servers 106 that are located proximate to each other and logically grouped together in a server farm 106. Geographically dispersed servers 106A-106N within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments the server farm 106 may be administered as a single entity, while in other embodiments the server farm 106 can include multiple server farms 106.

In some embodiments, a server farm 106 can include servers 106 that execute a substantially similar type of operating system platform (e.g., WINDOWS NT, manufactured by Microsoft Corp. of Redmond, Wash., UNIX, LINUX, or SNOW LEOPARD.) In other embodiments, the server farm 106 can include a first group of servers 106 that execute a first type of operating system platform, and a second group of servers 106 that execute a second type of operating system platform. The server farm 106, in other embodiments, can include servers 106 that execute different types of operating system platforms.

The server 106, in some embodiments, can be any server type. In other embodiments, the server 106 can be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 executing an active directory; or a server 106 executing an application acceleration program that provides firewall functionality, application functionality, or load balancing functionality. In some embodiments, a server 106 may be a RADIUS server that includes a remote authentication dial-in user service. In embodiments where the server 106 comprises an appliance, the server 106 can be an appliance manufactured by any one of the following manufacturers: the Citrix Application Networking Group; Silver Peak Systems, Inc; Riverbed Technology, Inc.; F5 Networks, Inc.; or Juniper Networks, Inc. Some embodiments include a first server 106A that receives requests from a client machine 102, forwards the request to a second server 106B, and responds to the request generated by the client machine 102 with a response from the second server 106B. The first server 106A can acquire an enumeration of applications available to the client machine 102 and well as address information associated with an application server 106 hosting an application identified within the enumeration of applications. The first server 106A can then present a response to the client's request using a web interface, and communicate directly with the client 102 to provide the client 102 with access to an identified application.

The server 106 can, in some embodiments, execute any one of the following applications: a thin-client application using a thin-client protocol to transmit application display data to a client; a remote display presentation application; any portion of the CITRIX ACCESS SUITE by Citrix Systems, Inc. like the METAFRAME or CITRIX PRESENTATION SERVER; MICROSOFT WINDOWS Terminal Services manufactured by the Microsoft Corporation; or an ICA client, developed by Citrix Systems, Inc. Another embodiment includes a server 106 that is an application server such as: an email server that provides email services such as MICROSOFT EXCHANGE manufactured by the Microsoft Corporation; a web or Internet server; a desktop sharing server; a collaboration server; or any other type of application server. Still other embodiments include a server 106 that executes any one of the following types of hosted servers applications: GOTOMEETING provided by Citrix Online Division, Inc.; WEBEX provided by WebEx, Inc. of Santa Clara, Calif.; or Microsoft Office LIVE MEETING provided by Microsoft Corporation.

Client machines 102 can, in some embodiments, be a client node that seeks access to resources provided by a server 106. In other embodiments, the server 106 may provide clients 102 or client nodes with access to hosted resources. The server 106, in some embodiments, functions as a master node such that it communicates with one or more clients 102 or servers 106. In some embodiments, the master node can identify and provide address information associated with a server 106 hosting a requested application, to one or more clients 102 or servers 106. In still other embodiments, the master node can be a server farm 106, a client 102, a cluster of client nodes 102, or an appliance.

One or more clients 102 and/or one or more servers 106 can transmit data over a network 104 installed between machines and appliances within the computing environment 101. The network 104 can comprise one or more sub-networks, and can be installed between any combination of the clients 102, servers 106, computing machines and appliances included within the computing environment 101. In some embodiments, the network 104 can be: a local-area network (LAN); a metropolitan area network (MAN); a wide area network (WAN); a primary network 104 comprised of multiple sub-networks 104 located between the client machines 102 and the servers 106; a primary public network 104 with a private sub-network 104; a primary private network 104 with a public sub-network 104; or a primary private network 104 with a private sub-network 104. Still further embodiments include a network 104 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; or a network 104 that includes a wireless link where the wireless link can be an infrared channel or satellite band. The network topology of the network 104 can differ within different embodiments, possible network topologies include: a bus network topology; a star network topology; a ring network topology; a repeater-based network topology; or a tiered-star network topology. Additional embodiments may include a network 104 of mobile telephone networks that use a protocol to communicate among mobile devices, where the protocol can be any one of the following: AMPS; TDMA; CDMA; GSM; GPRS UMTS; or any other protocol able to transmit data among mobile devices.

Figure 1B:
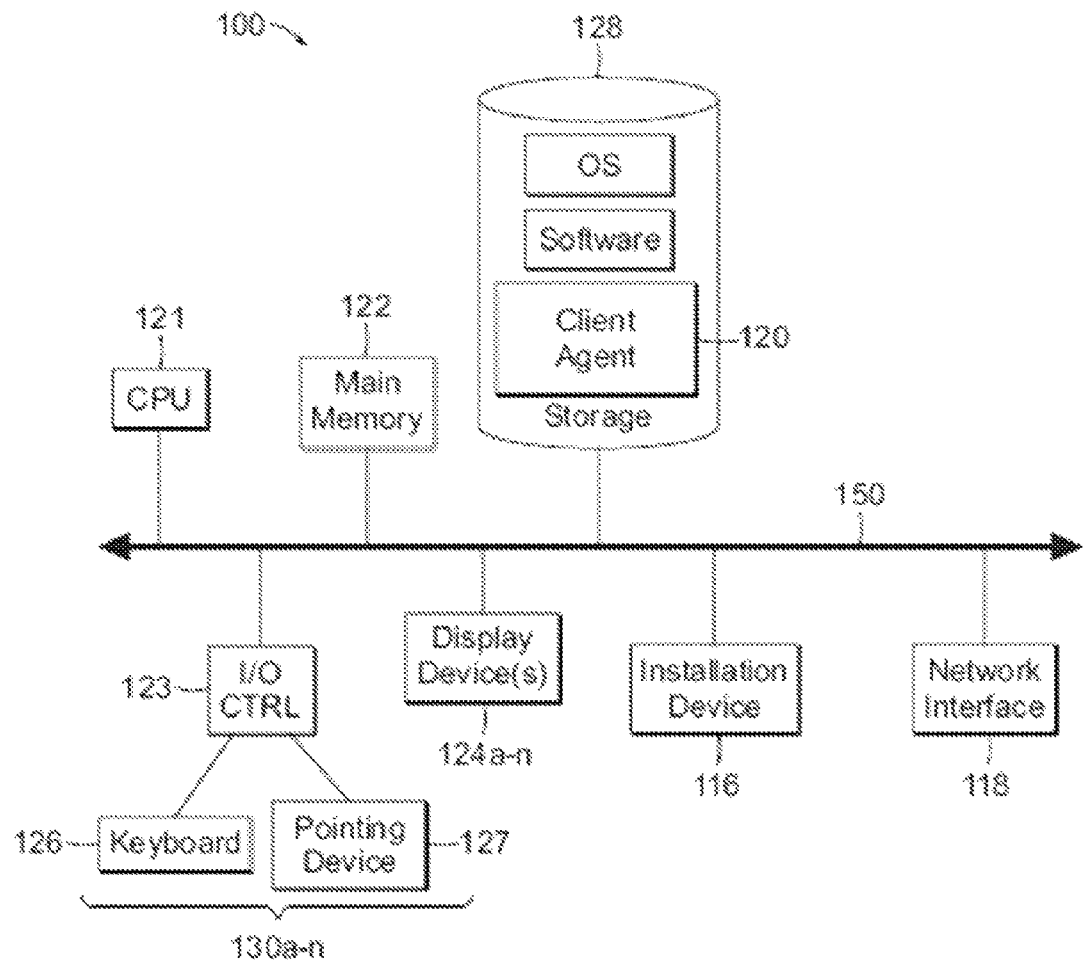
FIG. 1B and FIG. 1C are block diagrams that depict embodiments of computing devices.

Illustrated in FIG. 1B is an embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a central processing unit 121; a main memory 122; storage memory 128; an input/output (I/O) controller 123; display devices 124A-124N; an installation device 116; and a network interface 118. In one embodiment, the storage memory 128 includes: an operating system, software routines, and a client agent 120. The I/O controller 123, in some embodiments, is further connected to a key board 126, and a pointing device 127. Other embodiments may include an I/O controller 123 connected to more than one input/output device 130A-130N.

Figure 1C:
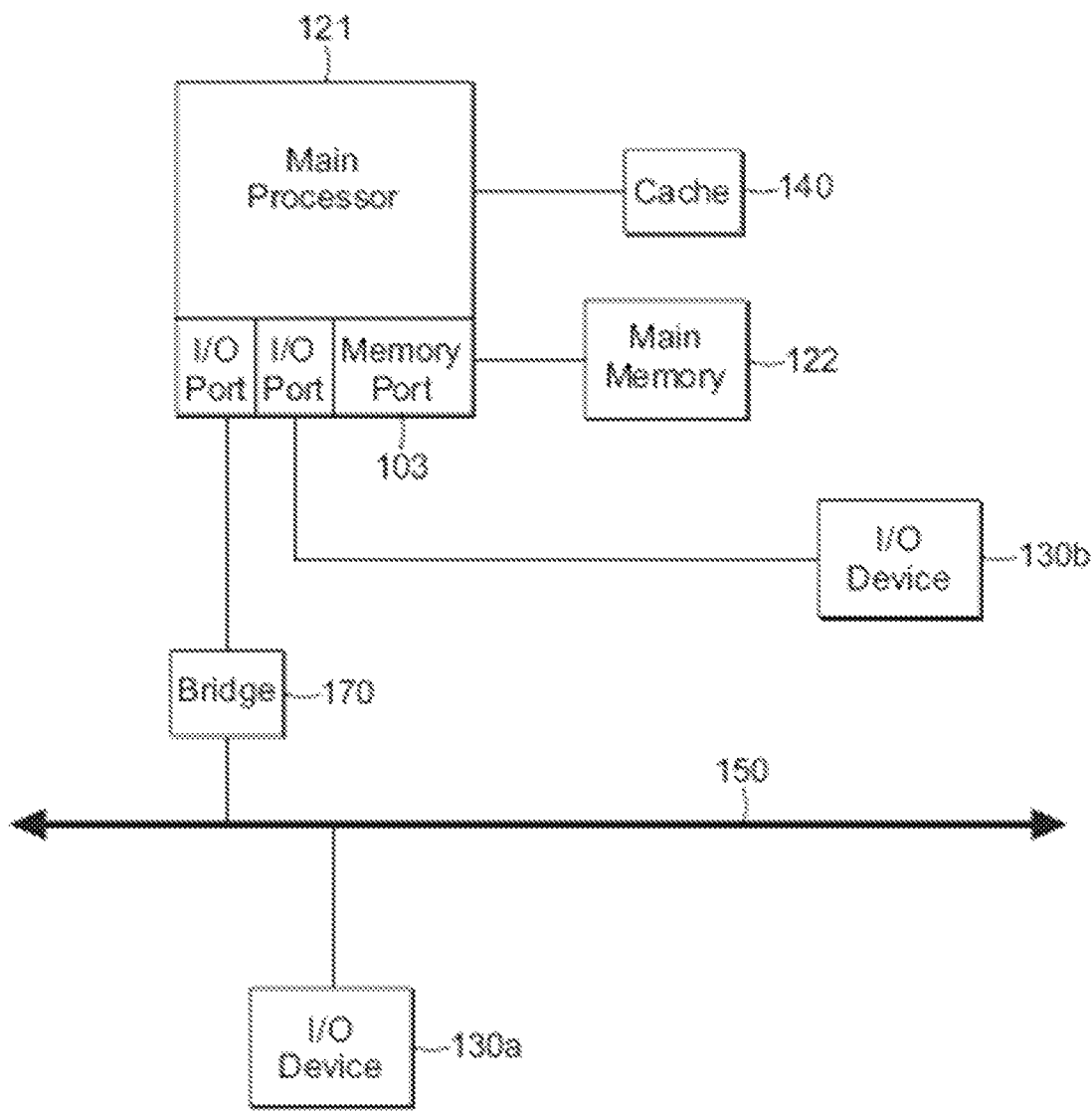

FIG. 1C illustrates one embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a bridge 170, and a first I/O device 130A. In another embodiment, the bridge 170 is in further communication with the main central processing unit 121, where the central processing unit 121 can further communicate with a second I/O device 130B, a main memory 122, and a cache memory 140. Included within the central processing unit 121, are I/O ports, a memory port 103, and a main processor.

Embodiments of the computing machine 100 can include a central processing unit 121 characterized by any one of the following component configurations: logic circuits that respond to and process instructions fetched from the main memory unit 122; a microprocessor unit, such as: those manufactured by Intel Corporation; those manufactured by Motorola Corporation; those manufactured by Transmeta Corporation of Santa Clara, Calif.; the RS/6000 processor such as those manufactured by International Business Machines; a processor such as those manufactured by Advanced Micro Devices; or any other combination of logic circuits. Still other embodiments of the central processing unit 122 may include any combination of the following: a microprocessor, a microcontroller, a central processing unit with a single processing core, a central processing unit with two processing cores, or a central processing unit with more than one processing core.

While FIG. 1C illustrates a computing device 100 that includes a single central processing unit 121, in some embodiments the computing device 100 can include one or more processing units 121. In these embodiments, the computing device 100 may store and execute firmware or other executable instructions that, when executed, direct the one or more processing units 121 to simultaneously execute instructions or to simultaneously execute instructions on a single piece of data. In other embodiments, the computing device 100 may store and execute firmware or other executable instructions that, when executed, direct the one or more processing units to each execute a section of a group of instructions. For example, each processing unit 121 may be instructed to execute a portion of a program or a particular module within a program.

In some embodiments, the processing unit 121 can include one or more processing cores. For example, the processing unit 121 may have two cores, four cores, eight cores, etc. In one embodiment, the processing unit 121 may comprise one or more parallel processing cores. The processing cores of the processing unit 121, may in some embodiments access available memory as a global address space, or in other embodiments, memory within the computing device 100 can be segmented and assigned to a particular core within the processing unit 121. In one embodiment, the one or more processing cores or processors in the computing device 100 can each access local memory. In still another embodiment, memory within the computing device 100 can be shared amongst one or more processors or processing cores, while other memory can be accessed by particular processors or subsets of processors. In embodiments where the computing device 100 includes more than one processing unit, the multiple processing units can be included in a single integrated circuit (IC). These multiple processors, in some embodiments, can be linked together by an internal high speed bus, which may be referred to as an element interconnect bus.

In embodiments where the computing device 100 includes one or more processing units 121, or a processing unit 121 including one or more processing cores, the processors can execute a single instruction simultaneously on multiple pieces of data (SIMD), or in other embodiments can execute multiple instructions simultaneously on multiple pieces of data (MIMD). In some embodiments, the computing device 100 can include any number of SIMD and MIMD processors.

The computing device 100, in some embodiments, can include a graphics processor or a graphics processing unit (Not Shown). The graphics processing unit can include any combination of software and hardware, and can further input graphics data and graphics instructions, render a graphic from the inputted data and instructions, and output the rendered graphic. In some embodiments, the graphics processing unit can be included within the processing unit 121. In other embodiments, the computing device 100 can include one or more processing units 121, where at least one processing unit 121 is dedicated to processing and rendering graphics.

One embodiment of the computing machine 100 includes a central processing unit 121 that communicates with cache memory 140 via a secondary bus also known as a backside bus, while another embodiment of the computing machine 100 includes a central processing unit 121 that communicates with cache memory via the system bus 150. The local system bus 150 can, in some embodiments, also be used by the central processing unit to communicate with more than one type of I/O device 130A-130N. In some embodiments, the local system bus 150 can be any one of the following types of buses: a VESA VL bus; an ISA bus; an EISA bus; a Micro-Channel Architecture (MCA) bus; a PCI bus; a PCI-X bus; a PCI-Express bus; or a NuBus. Other embodiments of the computing machine 100 include an I/O device 130A-130N that is a video display 124 that communicates with the central processing unit 121. Still other versions of the computing machine 100 include a processor 121 connected to an I/O device 130A-130N via any one of the following connections: HyperTransport, Rapid I/O, or InfiniBand. Further embodiments of the computing machine 100 include a processor 121 that communicates with one I/O device 130A using a local interconnect bus and a second I/O device 130B using a direct connection.

The computing device 100, in some embodiments, includes a main memory unit 122 and cache memory 140. The cache memory 140 can be any memory type, and in some embodiments can be any one of the following types of memory: SRAM; BSRAM; or EDRAM. Other embodiments include cache memory 140 and a main memory unit 122 that can be any one of the following types of memory: Static random access memory (SRAM), Burst SRAM or Synch-Burst SRAM (BSRAM); Dynamic random access memory (DRAM); Fast Page Mode DRAM (FPM DRAM); Enhanced DRAM (EDRAM), Extended Data Output RAM (EDO RAM); Extended Data Output DRAM (EDO DRAM); Burst Extended Data Output DRAM (BEDO DRAM); Enhanced DRAM (EDRAM); synchronous DRAM (SDRAM); JEDEC SRAM; PC100 SDRAM; Double Data Rate SDRAM (DDR SDRAM); Enhanced SDRAM (ESDRAM); SyncLink DRAM (SLDRAM); Direct Rambus DRAM (DRDRAM); Ferroelectric RAM (FRAM); or any other type of memory. Further embodiments include a central processing unit 121 that can access the main memory 122 via: a system bus 150; a memory port 103; or any other connection, bus or port that allows the processor 121 to access memory 122.

One embodiment of the computing device 100 provides support for any one of the following installation devices 116: a CD-ROM drive, a CD-R/RW drive, a DVD-ROM drive, tape drives of various formats, USB device, a bootable medium, a bootable CD, a bootable CD for GNU/Linux distribution such as KNOPPIX®, a hard-drive or any other device suitable for installing applications or software. Applications can in some embodiments include a client agent 120, or any portion of a client agent 120. The computing device 100 may further include a storage device 128 that can be either one or more hard disk drives, or one or more redundant arrays of independent disks; where the storage device is configured to store an operating system, software, programs applications, or at least a portion of the client agent 120. A further embodiment of the computing device 100 includes an installation device 116 that is used as the storage device 128.

The computing device 100 may further include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the computing device 100 includes a network interface 118 able to communicate with additional computing devices 100' via any type and/or form of gateway or tunneling protocol such as Secure Socket Layer (SSL) or Transport Layer Security (TLS), or the Citrix Gateway Protocol manufactured by Citrix Systems, Inc. Versions of the network interface 118 can comprise any one of: a built-in network adapter; a network interface card; a PCMCIA network card; a card bus network adapter; a wireless network adapter; a USB network adapter; a modem; or any other device suitable for interfacing the computing device 100 to a network capable of communicating and performing the methods and systems described herein.

Embodiments of the computing device 100 include any one of the following I/O devices 130A-130N: a keyboard 126; a pointing device 127; mice; trackpads; an optical pen; trackballs; microphones; drawing tablets; video displays; speakers; inkjet printers; laser printers; and dye-sublimation printers; or any other input/output device able to perform the methods and systems described herein. An I/O controller 123 may in some embodiments connect to multiple I/O devices 103A-130N to control the one or more I/O devices. Some embodiments of the I/O devices 130A-130N may be configured to provide storage or an installation medium 116, while others may provide a universal serial bus (USB) interface for receiving USB storage devices such as the USB Flash Drive line of devices manufactured by Twintech Industry, Inc. Still other embodiments include an I/O device 130 that may be a bridge between the system bus 150 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a FibreChannel bus; or a Serial Attached small computer system interface bus.

In some embodiments, the computing machine 100 can connect to multiple display devices 124A-124N, in other embodiments the computing device 100 can connect to a single display device 124, while in still other embodiments the computing device 100 connects to display devices 124A-124N that are the same type or form of display, or to display devices that are different types or forms. Embodiments of the display devices 124A-124N can be supported and enabled by the following: one or multiple I/O devices 130A-130N; the I/O controller 123; a combination of I/O device(s) 130A-130N and the I/O controller 123; any combination of hardware and software able to support a display device 124A-124N; any type and/or form of video adapter, video card, driver, and/or library to interface, communicate, connect or otherwise use the display devices 124A-124N. The computing device 100 may in some embodiments be configured to use one or multiple display devices 124A-124N, these configurations include: having multiple connectors to interface to multiple display devices 124A-124N; having multiple video adapters, with each video adapter connected to one or more of the display devices 124A-124N; having an operating system configured to support multiple displays 124A-124N; using circuits and software included within the computing device 100 to connect to and use multiple display devices 124A-124N; and executing software on the main computing device 100 and multiple secondary computing devices to enable the main computing device 100 to use a secondary computing device's display as a display device 124A-124N for the main computing device 100. Still other embodiments of the computing device 100 may include multiple display devices 124A-124N provided by multiple secondary computing devices and connected to the main computing device 100 via a network.

In some embodiments, the computing machine 100 can execute any operating system, while in other embodiments the computing machine 100 can execute any of the following operating systems: versions of the MICROSOFT WINDOWS operating systems such as WINDOWS 3.x; WINDOWS 95; WINDOWS 98; WINDOWS 2000; WINDOWS NT 3.51; WINDOWS NT 4.0; WINDOWS CE; WINDOWS XP; and WINDOWS VISTA; the different releases of the Unix and Linux operating systems; any version of the MAC OS manufactured by Apple Computer; OS/2, manufactured by International Business Machines; any embedded operating system; any real-time operating system; any open source operating system; any proprietary operating system; any operating systems for mobile computing devices; or any other operating system. In still another embodiment, the computing machine 100 can execute multiple operating systems. For example, the computing machine 100 can execute PARALLELS or another virtualization platform that can execute or manage a virtual machine executing a first operating system, while the computing machine 100 executes a second operating system different from the first operating system.

The computing machine 100 can be embodied in any one of the following computing devices: a computing workstation; a desktop computer; a laptop or notebook computer; a server; a handheld computer; a mobile telephone; a portable telecommunication device; a media playing device; a gaming system; a mobile computing device; a netbook; a device of the IPOD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other embodiments the computing machine 100 can be a mobile device such as any one of the following mobile devices: a JAVA-enabled cellular telephone or personal digital assistant (PDA), such as the i55sr, i58sr, i85s, i88s, i90c, i95cl, or the im1100, all of which are manufactured by Motorola Corp; the 6035 or the 7135, manufactured by Kyocera; the i300 or i330, manufactured by Samsung Electronics Co., Ltd; the TREO 180, 270, 600, 650, 680, 700p, 700w, or 750 smart phone manufactured by Palm, Inc; any computing device that has different processors, operating systems, and input devices consistent with the device; or any other mobile computing device capable of performing the methods and systems described herein. In still other embodiments, the computing device 100 can be any one of the following mobile computing devices: any one series of Blackberry, or other handheld device manufactured by Research In Motion Limited; the iPhone manufactured by Apple Computer; Palm Pre; a Pocket PC; a Pocket PC Phone; or any other handheld mobile device.

Figure 2A:
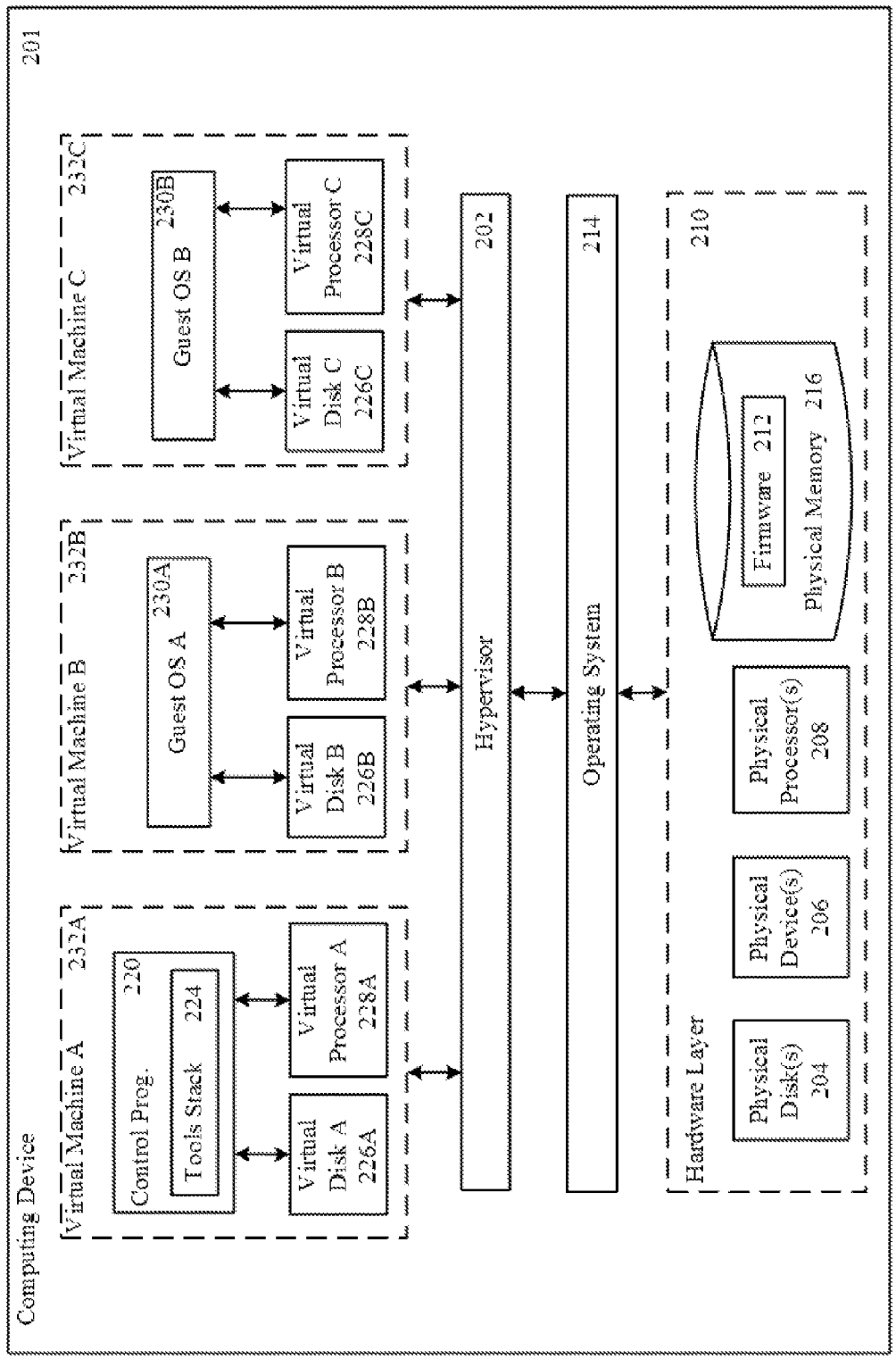
FIG. 2A and FIG. 2B are block diagrams that depict embodiments of a virtualization environment.

Illustrated in FIG. 2A is one embodiment of a virtualization environment. Included on a computing device 201 is a hardware layer that can include one or more physical disks 204, one or more physical devices 206, one or more physical processors 208 and a physical memory 216. In some embodiments, firmware 212 can be stored within a memory element in the physical memory 216 and can be executed by one or more of the physical processors 208. The computing device 201 can further include an operating system 214 that can be stored in a memory element in the physical memory 216 and executed by one or more of the physical processors 208. Still further, a hypervisor 202 can be stored in a memory element in the physical memory 216 and can be executed by one or more of the physical processors 208. Executing on one or more of the physical processors 208 can be one or more virtual machines 232A-C (generally 232). Each virtual machine 232 can have a virtual disk 226A-C and a virtual processor 228A-C. In some embodiments, a first virtual machine 232A can execute, on a virtual processor 228A, a control program 220 that includes a tools stack 224. In other embodiments, one or more virtual machines 232B-C can executed, on a virtual processor 228B-C, a guest operating system 230A-B.

Further referring to FIG. 2A, and in more detail, in one embodiment the virtualization environment described includes a Type 2 hypervisor 202, or a hypervisor that executes within an operating system 214 executing on the computing device 201. A Type 2 hypervisor, in some embodiments, executes within an operating system 214 environment and virtual machines execute at a level above the hypervisor. In many embodiments, the Type 2 hypervisor executes within the context of a user's operating system such that the Type 2 hypervisor interacts with the user's operating system.

In some embodiments, the virtualization environment includes a computing device 201. The computing device 201 can be any computing device, and in some embodiments the computing device 201 can be any computer, device or computing machine described herein. While FIG. 2A illustrates a single computing device 201, in some embodiments the modules, programs, virtual machines, and commands stored and executed by the computing device 201 can be executed by more than one computing device 201. In still other embodiments, the computing device 201 can be a server farm.

In one embodiment, the computing device 201 can include a hardware layer 210 that includes one or more pieces of hardware that communicates with the computing machine 201. In some embodiments, the hardware layer 210 can include any hardware included in the computing device 201. In other embodiments, the hardware layer 210 can include one or more physical disks 204, one or more physical devices 206, one or more physical processors 208 and memory 216.

The hardware layer 210, in some embodiments, can include one or more physical disks 204. A physical disk 204 can be any hard disk, while in some embodiments a physical disk 204 can be any hard disk described herein. In some embodiments, the hardware layer 210 can include one physical disk 204. In other embodiments, the hardware layer 210 can include more than one physical disk 204. The computing device 201, in some embodiments, can communicate with an external hard disk that is included in the hardware layer 210 as a physical disk 204.

In other embodiments, the hardware layer 210 can include a processor 208. The processor 208, in some embodiments, can be any processor, while in other embodiments the processor 208 can be any processor described herein. The processor 208 can include one or more processing cores. In other embodiments the computing device 201 can include one or more processors 208. In some embodiments, the computing device 201 can include one or more different processors, e.g. a processing unit, a graphics processing unit, or a physics engine.

Physical devices 206, in some embodiments, can be any device included in the computing device 201. In some embodiments, physical devices 206 can be any combination of devices included in the computing device 201 and external devices that communicate with the computing device 201. The computing device 201, in some embodiments, can include one or more physical devices 206. A physical device 206 can be any of the following: a network interface card; a video card; a keyboard; a mouse; an input device; a monitor; a display device; speakers; an optical drive; a storage device; a universal serial bus connection; any device connected to the computing device 201; any device communicating with the computing device 201; a printer; a scanner; or any other device or device described herein.

The hardware layer 210 can further include physical memory 216 that can include any type of memory. In some embodiments, the physical memory 216 can include any memory type described herein. The physical memory 216 can store data, and in some embodiments can store one or more programs, or set of executable instructions. FIG. 2A illustrates one embodiment where firmware 212 is stored within the physical memory 216 of the computing device 201. Programs or executable instructions stored in the physical memory 216 can be executed by the one or more processors 208 of the computing device 201.

Firmware 212, in some embodiments, can be any combination of executable instructions and hardware that controls hardware communicating with or included within the computing device 201. In some embodiments, the firmware 212 can control one or more pieces of hardware within the hardware layer 210. Firmware 212, in many embodiments, can be executed by one or more processors 208 within the computing device 201. In some embodiments, the firmware 212 can be boot firmware such as the basic input/output system (BIOS.) Additional firmware 212 executing on the computing device 201 can interface with the BIOS.

In one embodiment, the computing device 201 can include an operating system 214 executed by one or more physical processors 208. In some embodiments, the operating system 214 is a user operating system that can directly access the hardware devices in the hardware layer 210. The operating system 214 can be any operating system and in some embodiments, the operating system 214 can be any operating system described herein. FIG. 2A illustrates one embodiment where the hypervisor 202 executes within the context of the operating system 214 executing on the computing device 201. In this embodiment, the operating system 214 can be referred to as a host operating system 214, while the other operating systems can be referred to as guest operating systems. Guest operating systems can include the guest operating systems 230A-B executing on the virtual machines 232, and/or the control program 220.

In some embodiments, the computing device 201 can include a hypervisor 202. A hypervisor 202, in some embodiments, can be a program that executed by processors 208 on the computing device 201 to manage any number of virtual machines. The hypervisor 202 can be referred to as a virtual machine monitor, or platform virtualization software. In some embodiments, a hypervisor 202 can be any combination of executable instructions and hardware that monitors virtual machines executing on a computing machine. While FIG. 2A illustrates a virtualization environment that includes a Type 2 hypervisor 202, the computing device 201 can execute any other type of hypervisor. For example, the computing device 201 can execute a virtualization environment that includes a Type 1 hypervisor 202. In some embodiments, the computing device 201 can execute one or more hypervisors 202. These one or more hypervisors 202 can be the same type of hypervisor, or in other embodiments can be different hypervisor types.

The hypervisor 202, in some embodiments, can provide virtual resources to operating systems 230 or control programs 220 executing on virtual machines 232 in any manner that simulates the operating systems 230 or control programs 220 having direct access to system resources. System resources can include: physical devices; physical disks; physical processors; physical memory 216 and any other component included in the computing device 201 hardware layer 210. In these embodiments, the hypervisor 202 may be used to emulate virtual hardware, partition physical hardware, virtualize physical hardware, or execute virtual machines that provide access to computing environments. In still other embodiments, the hypervisor 202 controls processor scheduling and memory partitioning for a virtual machine 232 executing on the computing device 201. Hypervisor 202 may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, a computing device 201 executes a hypervisor 202 that creates a virtual machine platform on which guest operating systems may execute. In these embodiments, the computing device 201 can be referred to as a host server. An example of such a computing device is the XEN SERVER provided by Citrix Systems, Inc., of Fort Lauderdale, Fla.

In one embodiment, the hypervisor 202 can create a virtual machine 232A-B (generally 232) in which an operating system 230 executes. In one of these embodiments, for example, the hypervisor 202 loads a virtual machine image to create a virtual machine 232. In another of these embodiments, the hypervisor 202 executes an operating system 230 within the virtual machine 232. In still another of these embodiments, the virtual machine 232 executes an operating system 230.

In one embodiment, the hypervisor 202 controls the execution of at least one virtual machine 232. In another embodiment, the hypervisor 202 presents at least one virtual machine 232 with an abstraction of at least one hardware resource provided by the computing device 201. The abstraction can further be referred to as a virtualization or virtual view of the hardware, memory processor and other system resources available on the computing device 201. Hardware or hardware resources, in some embodiments, can be any hardware resource available within the hardware layer 210. In other embodiments, the hypervisor 202 controls the manner in which virtual machines 232 access the physical processors 208 available in the computing device 201. Controlling access to the physical processors 208 can include determining whether a virtual machine 232 should have access to a processor 208, and how physical processor capabilities are presented to the virtual machine 232.

In some embodiments, the computing device 201 can host or execute one or more virtual machines 232. A virtual machine 232 can be called a domain, a guest and/or a DOMAIN U. A virtual machine 232 is a set of executable instructions that, when executed by a processor 208, imitate the operation of a physical computer such that the virtual machine 232 can execute programs and processes much like a physical computing device. While FIG. 2A illustrates an embodiment where a computing device 201 hosts three virtual machines 232, in other embodiments the computing device 201 can host any number of virtual machines 232. The hypervisor 202, in some embodiments, provides each virtual machine 232 with a unique virtual view of the physical hardware, memory, processor and other system resources available to that virtual machine 232. In some embodiments, the unique virtual view can be based on any of the following: virtual machine permissions; application of a policy engine to one or more virtual machine identifiers; the user accessing a virtual machine; the applications executing on a virtual machine; networks accessed by a virtual machine; or any other similar criteria. The hypervisor 202, in other embodiments, provides each virtual machine 232 with a substantially similar virtual view of the physical hardware, memory, processor and other system resources available to the virtual machines 232.

Each virtual machine 232 can include a virtual disk 226A-C (generally 226) and a virtual processor 228A-C (generally 228.) The virtual disk 226, in some embodiments, is a virtualized view of one or more physical disks 204 of the computing device 201, or a portion of one or more physical disks 204 of the computing device 201. The virtualized view of the physical disks 204 can be generated, provided and managed by the hypervisor 202. In some embodiments, the hypervisor 202 provides each virtual machine 232 with a unique view of the physical disks 204. Thus, in these embodiments, the virtual disk 226 included in each virtual machine 232 can be unique when compared with the other virtual disks 226.

A virtual processor 228 can be a virtualized view of one or more physical processors 208 of the computing device 201. In some embodiments, the virtualized view of the physical processors 208 can be generated, provided and managed by the hypervisor 202. In some embodiments, the virtual processor 228 has substantially all of the same characteristics of at least one physical processor 208. In other embodiments, the virtual processor 208 provides a modified view of the physical processors 208 such that at least some of the characteristics of the virtual processor 228 are different than the characteristics of the corresponding physical processor 208.

A control program 220 may execute at least one application for managing and configuring the guest operating systems executing on the virtual machines 232 and in some embodiments the computing device 201. In some embodiments, the control program 220 can be called a control operating system, a control domain, domain 0 or dom 0. The control program 220, in some embodiments, can be DOMAIN o or DOM0 of the XEN hypervisor. The control program 220 can execute an administrative application or program that can further display a user interface which administrators can use to access the functionality of each virtual machine 232 and/or to manage the virtual machines 232. In some embodiments, the user interface generated by the administrative program can be used to terminate the execution of virtual machines 232, allocate resources to virtual machines 232, assign permissions to virtual machines 232, or manage security credentials associated with virtual machines 232. The control program 220, in some embodiments, can start new virtual machines 232 or terminate execution of executing virtual machines 232. In other embodiments, the control program 220 can directly access hardware and/or resources within the hardware layer 210. In still another embodiment, the control program 220 can interface with programs and applications executing on the computing device 210 and outside of the context of a virtual machine 232. Similarly, the control program 220 can interface with programs and applications executing within the context of a virtual machine 232.

In one embodiment, the hypervisor 202 can execute the control program 220 within a virtual machine 232. The hypervisor 202 can create and start the virtual machine 232. In embodiments where the hypervisor 202 executes the control program 220 within a virtual machine 232, that virtual machine 232 can be referred to as the control virtual machine 232. In still another embodiment, the control program 220 executes within a virtual machine 232 that is authorized to directly access physical resources on the computing device 201.

In some embodiments, a control program 220A (Not Shown) on a first computing device 201A (Not Shown) may exchange data with a control program 220B (Not Shown) on a second computing device 201B (Not Shown). In these embodiments the first computing device 201A may be located remote from the second computing device 201B. The control programs 220A-B can exchange data via a communication link between a hypervisor 202A (Not Shown) executing on the first computing device 201A and a hypervisor 202B (Not Shown) executing on the second computing device 201B. Through this communication link, the computing devices 201A-B can exchange data regarding processors and other physical resources available in a pool of resources. Further, through this connection between hypervisors 202A-B, the hypervisors 202A-B can manage a pool of resources, e.g. the resources available on the first computing device 201A and the second computing device 201B, distributed across one or more computing devices 201A-B. The hypervisors 202A-B can further virtualize these resources and make them available to virtual machines 232 executing on the computing devices 201A-B. In another instance of this embodiment, a single hypervisor 202 can manage and control virtual machines 232 executing on both computing devices 201A-B.

In some embodiments, the control program 220 interacts with one or more guest operating systems 230A-B (generally 230.) The control program 220 can communicate with the guest operating systems 230 through a hypervisor 202. Through the hypervisor 202, the guest operating system 230 can request access to physical disks 204, physical processors 208, memory 216, physical devices 206 and any other component in the hardware layer 210. In still other embodiments, the guest operating systems 230 can communicate with the control program 220 via a communication channel established by the hypervisor 202, such as, for example, via a plurality of shared memory pages made available by the hypervisor 202.

In some embodiments, the control program 220 includes a network back-end driver for communicating directly with networking hardware provided by the computing device 201. In one of these embodiments, the network back-end driver processes at least one virtual machine request from at least one guest operating system 230. In other embodiments, the control program 220 includes a block back-end driver for communicating with a storage element on the computing device 201. In one of these embodiments, the block back-end driver reads and writes data from the storage element based upon at least one request received from a guest operating system 230.

In another embodiment, the control program 220 includes a tools stack 224. In another embodiment, a tools stack 224 provides functionality for interacting with the hypervisor 202, communicating with other control programs 220 (for example, on a second computing device 201B), or managing virtual machines 232 on the computing device 201. In another embodiment, the tools stack 224 includes customized applications for providing improved management functionality to an administrator of a virtual machine farm. In some embodiments, at least one of the tools stack 224 and the control program 220 include a management API that provides an interface for remotely configuring and controlling virtual machines 232 running on a computing device 201. In other embodiments, the control program 220 communicates with the hypervisor 202 through the tools stack 224.

In one embodiment, the hypervisor 202 executes a guest operating system 230 within a virtual machine 232 created by the hypervisor 202. In another embodiment, the guest operating system 230 provides a user of the computing device 201 with access to resources within a computing environment. In still another embodiment, a resource includes a program, an application, a document, a file, a plurality of applications, a plurality of files, an executable program file, a desktop environment, a computing environment, or other resource made available to a user of the computing device 201. In yet another embodiment, the resource may be delivered to the computing device 201 via a plurality of access methods including, but not limited to, conventional installation directly on the computing device 201, delivery to the computing device 201 via a method for application streaming, delivery to the computing device 201 of output data generated by an execution of the resource on a second computing device 201' and communicated to the computing device 201 via a presentation layer protocol, delivery to the computing device 201 of output data generated by an execution of the resource via a virtual machine executing on a second computing device 201', or execution from a removable storage device connected to the computing device 201, such as a USB device, or via a virtual machine executing on the computing device 201 and generating output data. In some embodiments, the computing device 201 transmits output data generated by the execution of the resource to another computing device 201'.

In one embodiment, the guest operating system 230, in conjunction with the virtual machine on which it executes, forms a fully-virtualized virtual machine that is not aware that it is a virtual machine; such a machine may be referred to as a "Domain U HVM (Hardware Virtual Machine) virtual machine". In another embodiment, a fully-virtualized machine includes software emulating a Basic Input/Output System (BIOS) in order to execute an operating system within the fully-virtualized machine. In still another embodiment, a fully-virtualized machine may include a driver that provides functionality by communicating with the hypervisor 202. In such an embodiment, the driver is typically aware that it executes within a virtualized environment.

In another embodiment, the guest operating system 230, in conjunction with the virtual machine on which it executes, forms a paravirtualized virtual machine, which is aware that it is a virtual machine; such a machine may be referred to as a "Domain U PV virtual machine". In another embodiment, a paravirtualized machine includes additional drivers that a fully-virtualized machine does not include. In still another embodiment, the paravirtualized machine includes the network back-end driver and the block back-end driver included in a control program 220, as described above.

Figure 2B:
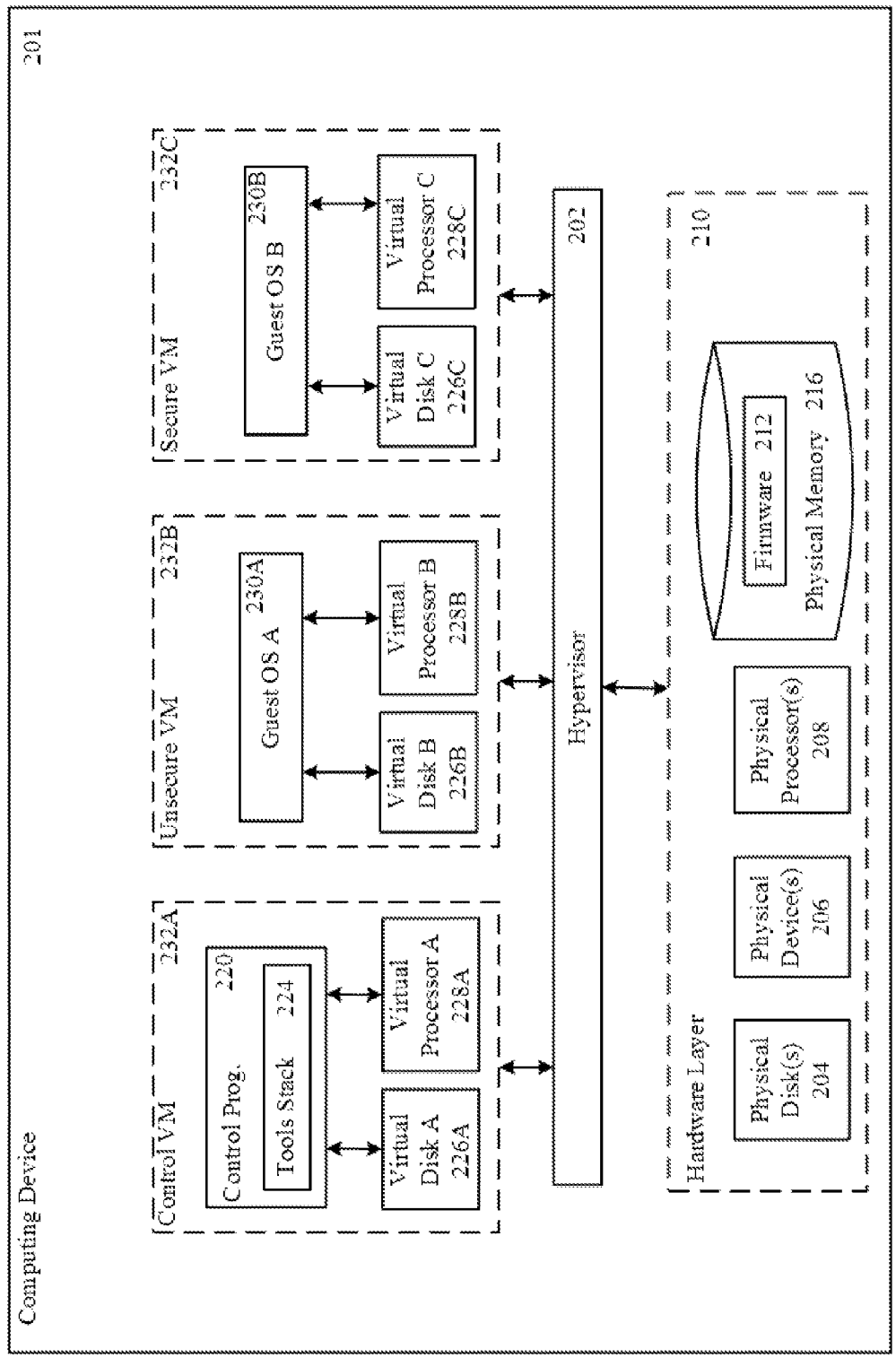

Illustrated in FIG. 2B is another embodiment of a virtualization environment that illustrates a Type 1 hypervisor 202. Executing on the computing device 201 is a hypervisor 202 that can directly access the hardware and resources within the hardware layer 210. Virtual machines 232 managed by the hypervisor 202 can be an unsecure virtual machine 232B and/or a secure virtual machine 232C. Whereas the virtualization environment depicted in FIG. 2A illustrates a host operating system 214, the virtualization environment embodiment in FIG. 2B does not execute a host operating system.

Further referring to FIG. 2B, and in more detail, the virtualization environment includes a Type 1 hypervisor 202. Type 1 hypervisors 202, in some embodiments, execute on "bare metal," such that the hypervisor 202 has direct access to all applications and processes executing on the computing device 201, all resources on the computing device 201 and all hardware on the computing device 201 or communicating with the computing device 201. While a Type 2 hypervisor 202 accesses system resources through a host operating system 214, a Type 1 hypervisor 202 can directly access all system resources. The Type 1 hypervisor 202 can execute directly on one or more physical processors of the computing device 201, and can include program data stored in the physical memory 216.

In a virtualization environment that employs a Type 1 hypervisor 202 configuration, the host operating system can be executed by one or more virtual machines 232. Thus, a user of the computing device 201 can designate one or more virtual machines 232 as the user's personal machine. This virtual machine can imitate the host operating system by allowing a user to interact with the computing device 201 in substantially the same manner that the user would interact with the computing device 201 via a host operating system 214.

Virtual machines 232 can be unsecure virtual machines 232B and secure virtual machine 232C. While FIG. 2B illustrates a secure and unsecure virtual machine, sometimes they can be referred to as privileged and unprivileged virtual machines. In some embodiments, a virtual machine's security can be determined based on a comparison of the virtual machine to other virtual machines executing within the same virtualization environment. For example, were a first virtual machine to have access to a pool of resources, and a second virtual machine not to have access to the same pool of resources; the second virtual machine could be considered an unsecure virtual machine 232B while the first virtual machine could be considered a secure virtual machine 232A. In some embodiments, a virtual machine's 323 ability to access one or more system resources can be configured using a configuration interface generated by either the control program 220 or the hypervisor 202. In other embodiments, the level of access afforded to a virtual machine 232 can be the result of a review of any of the following sets of criteria: the user accessing the virtual machine; one or more applications executing on the virtual machine; the virtual machine identifier; a risk level assigned to the virtual machine based on one or more factors; or any other similar criteria.

In some embodiments, unsecure virtual machines 232B may be prevented from accessing resources, hardware, memory locations, and programs that secure virtual machines 232A may access. For example, a secure virtual machine 232C may be able to access one or more company resources, while the unsecure virtual machine 232B cannot access any company resources.

Figure 3:
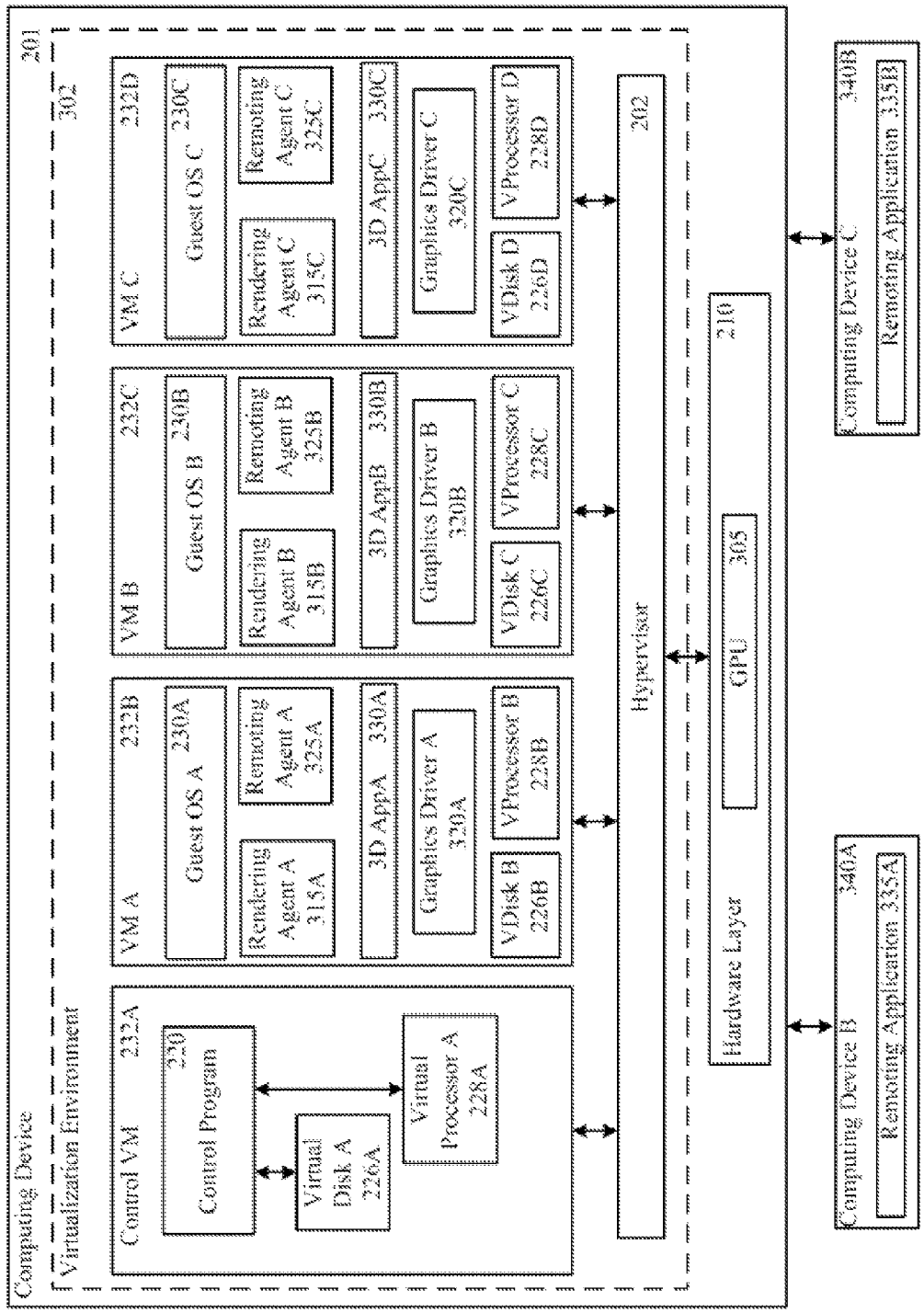
FIG. 3 is a block diagram that depicts an embodiment of a system for remoting three-dimensional images using virtual machines.

Illustrated in FIG. 3 is one embodiment of a system for remotely rendering three-dimensional images using virtual machines. The system can include a computing device 201 having a hardware layer 210 that can include a graphics processing unit (GPU) 305. The computing device 201 can execute a virtualization environment 302 that includes a hypervisor 202 and one or more virtual machines 232A-232D (herein referred to generally as virtual machines 232). In some instances, one of the virtual machines can be a control virtual machine 232A that can execute a control program 220 and can include a virtual disk 226A and a virtual processor 228A. Additional virtual machines 232B-232D can execute within the virtualization environment 302. These virtual machines 232B-232D can execute a guest operating system 230A-230C (referred to generally as a guest operating system 230), a rendering agent 315A-315C (referred to generally as a rendering agent 315), a graphics driver 320A-320C (referred to generally as a graphics driver 320), a remoting agent 325A-325C (referred to generally as a remoting agent 325), or any number of three-dimensional applications 330A-330C (referred to generally as a three-dimensional application 330). These virtual machines 232B-232D can also include a virtual disk 226 and a virtual processor 228. The computing device 201 can communicate with any number of additional computing devices 340A-340B. Each of these computing devices 340A-340B can execute a remoting application 335A-335B (referred to generally as a remoting application 335).

Referring to FIG. 3, and in more detail, in one embodiment the computing device 201 and the remote or other computing devices 340A-340B can be any computer, device or computing device described herein. In some embodiments, the computing device 201 and the other computing devices 340A-340B can be referred to as a computer or a computing machine. The other computing devices 340A-340B can be generally referred to as remote computing devices 340, as they are located in a remote location from the computing device 201. In some embodiments, the remote computing devices 340 can be referred to as client computing devices while the computing device 201 can be referred to as a server. The computing device 201, and the remote computing devices 340 can in some embodiments be physical computers. While FIG. 3 illustrates two remote computing devices 340, the computing device 201 can communicate with any number of remote computing devices 340. The remote computing devices 340 can be referred to as first, second or third computing devices.

The computing device 201 can communicate with remote computing devices 340 over a network such as any network described herein. In some embodiments, communication between the computing device 201 and the remote computing devices 340 can occur over a communication or virtual channel established between the computing device 201 and the remote computing devices 340. This communication channel can include any number of sub-channels, and in some embodiments the communication channel can be established using a remote display protocol such as RDP or the CITRIX ICA protocol. In one embodiment, the communication channel can be established between a remoting agent 325 on the computing device 201 and a remoting application 335 executing on a remote device 340.

The remoting application 335, in some embodiments, can be an application that can establish one or more communication channels with a remote computer 340. In some embodiments, the remoting application 335 can transmit application output to a remote computer for display, or can receive application output generated by an application executing on a remote computer. When the remoting application 335 receives application output generated by a remote application, the remoting application can display the received output in an application output window or a desktop.

In some instances, the remoting agent 325 can function substantially the same as the remoting application 335. The remoting agent 325 can receive application output generated by a locally executing application and can transmit that application output to a remote computer 340. In some embodiments, the remoting agent 325 can transmit the application output to a remoting application 335 executing on a remote computer 340. The remoting agent 325 can communicate with any of the applications or objects executing within the virtualization environment 302. In one embodiment, the remoting agent 325 can receive or obtain three-dimensional images from a graphics driver 320, a three-dimensional application 330, a rendering agent 315, storage buffer, or any other application, storage repository or object. Upon receiving or obtaining the three-dimensional images, the remoting agent 325 can transmit the received images to a remote computer 340. In some embodiments, the remoting agent 325 can receive three-dimensional draw commands instead of three-dimensional images. In those embodiments, the remoting agent 325 can transmit the received draw commands to a remote computer 340.

The hardware layer 210, in some embodiments, can be any hardware layer 210 described herein and can include any computer hardware described herein. FIG. 3 illustrates a hardware layer 210 that includes a graphics processing unit (GPU) 305. The GPU 305 can be a software application that receives three-dimensional draw commands and uses a graphics library to render three-dimensional images from the three-dimensional draw commands. In other embodiments, the GPU 305 can be a hardware element that receives three-dimensional draw commands and uses a graphics library to render three-dimensional images from the three-dimensional draw commands. In some embodiments the GPU 305 can be a combination of software or hardware, while in other embodiments the GPU 305 can be included in a central processing unit. In still other embodiments, the GPU 305 can reside on a graphics card or can comprise any number of GPUs, where each GPU may be dedicated to rendering a particular image aspect, e.g. texture, shading, etc. The GPU 305 can render both two-dimensional and three-dimensional images and can use any graphics library. In one embodiment, the GPU 305 can render three-dimensional images using any of the following graphics libraries: DIRECT3D; OGRE; OPENGL; QUESA; TEDDY3D; MESA3D; or any other graphics library that can be used to render three-dimensional images.

The virtualization environment 302, in some embodiments, can be any virtualization environment 302. In other embodiments, the virtualization environment 302 can be any virtualization environment 302 described herein. The virtualization environment 302 can contain the components necessary to generate, manage and execute at least one virtual machine on the physical computer 201. In some embodiments, the virtualization environment 302 can include a hypervisor 202. The hypervisor 202 can communicate with the hardware layer 210 of the physical computer 201 and in some embodiments can virtualize the hardware layer 210. In many embodiments, the hypervisor 202 can communicate with each of the virtual machines 232 and the control program 232. The hypervisor 202 can be any hypervisor and in some embodiments can be any hypervisor described herein. In some embodiments the hypervisor 202 can execute directly on the hardware of the computer 201, while in other embodiments the hypervisor 202 can execute on top of an operating system. The hypervisor 202, in some embodiments, can be the XEN hypervisor published by CITRIX SYSTEMS.

In some embodiments, a control virtual machine 232A can execute within the virtualization environment 302. The control virtual machine 232A can be any control virtual machine 232A described herein. In one embodiment, the control virtual machine 232A can be referred to as the Domain 0 virtual machine. In some embodiments, the control virtual machine 232A can execute a control program 220 such as any control program described herein. In still other embodiments, the control virtual machine 232A can include a virtual processor 228 and a virtual disk 226 such as any virtual disk or virtual processor described herein. While FIG. 3 illustrates a control virtual machine 232A that includes a control program 220, a virtual disk 226 and a virtual processor 228, in other embodiments the control virtual machine 232A can include any of the components included in the other virtual machines 232B-232D, e.g. guest operating system 230, rendering agent 315, remoting agent 325, three-dimensional applications 330, and a graphics driver 320.

The additional virtual machines 232 can be any virtual machine 232 described herein. In some embodiments, the additional virtual machines 232B-232D can be managed by the control virtual machine 232A and/or the control program 220. The additional virtual machines 232 can include a virtual disk 226B-226D such as any virtual disk described herein, and can include a virtual processor 228B-228D such as any virtual processor described herein. In some embodiments, the additional virtual machines 232 can execute a guest operating system 230 such as any guest operating system described herein.

The guest operating system 230 executed by a virtual machine 232 can in some embodiments be a paravirtualized operating system. Paravirtualized operating systems can be operating systems that are configured to operate within the context of a virtual environment. In many embodiments, paravirtualized operating systems provide applications, objects and components executing within the context of the paravirtualized operating system, direct access to the physical hardware virtualized by the hypervisor 202. In other embodiments, the guest operating system 230 can be a non-paravirtualized operating system. Non-paravirtualized operating systems can be operating systems that are not configured to operate within the context of a virtual environment. In many embodiments, non-paravirtualized operating systems provide applications, objects and components executing within the context of the non-paravirtualized operating system, direct access to the physical hardware virtualized by the hypervisor 202. The physical hardware, in some embodiments, can be any hardware included in the hardware layer 210. In other embodiments, the physical hardware can be any hardware in communication with the hypervisor 202 and virtualized by the hypervisor 202.

In some embodiments, each virtual machine 232 can include a graphics driver 320. The graphics driver 320 can be any graphics driver 320 and in some embodiment can be a three-dimensional graphics driver 320 able to intercept three-dimensional draw commands and forward the commands to a GPU 305 for rendering. In some embodiments, the graphics driver 320 can be a graphics driver 320 compatible with any GPU 305, and a graphics driver that can intercept and forward for rendering three-dimensional draw commands interpretable by any of the following graphics libraries: RECT3D; OGRE; OPENGL; QUESA; TEDDY3D; MESA3D; or any other graphics library that can be used to render two or three-dimensional images. In some embodiments, the graphics driver 320 can be an agent. For example, in one embodiment the graphics driver 320, i.e. the agent, can execute on one virtual machine 232C and can intercept three-dimensional draw commands generated by a three-dimensional application executing on the remote computer 340. Upon intercepting the three-dimensional draw commands, the agent 320 can forward the three-dimensional draw commands to a rendering agent 315 executing on another virtual machine 232B that has direct access or control over the GPU 305. Direct access or control, in this context, can be allocated to a virtual machine 232B by a hypervisor 202 or control program 220 when the hypervisor 202 or control program 220 allocates direct access to the GPU 305 to the virtual machine 232B executing on the computer 201. The rendering agent 315 can then forward the three-dimensional draw commands to the GPU 305 for rendering, and upon receiving the rendered three-dimensional image, can forward the three-dimensional image back to the agent executing on the virtual machine 232C. In some embodiments, the virtual machine 232C can then transmit the rendered three-dimensional image to another physical computer 340 remotely located from the computer 201 that includes the GPU 305 and executes the virtual machines 232B, 232C.

The graphics driver 320, in some embodiments, can be a modified graphics driver 320 able to intercept two or three-dimensional draw commands upon being denied access to a GPU 305. For example, in some embodiments, the graphics driver 320 can intercept a two or three-dimensional draw command and request access to a GPU 305. In response, the graphics driver 320 can receive a notification denying access to the GPU 305 to the graphics driver 320. Upon receiving such a notification, the graphics driver 320 can then forward the intercepted draw commands to another virtual machine having access to the GPU 305. In some embodiments, the graphics driver 320 can further be modified to include a hooking mechanism such as any hooking mechanism able to intercept two or three-dimensional draw commands and forward them to a GPU 305 for rendering or forward them to another virtual machine 232. The hooking mechanism can be a DIRECT3D hooking mechanism. In other embodiments, the graphics driver 320 can be modified to include a filter that can intercept two or three-dimensional draw commands and forward them to a GPU 305 for rendering or forward them to another virtual machine 232. In still other embodiments, the graphics driver 320 can be modified to include a file system driver, a mini-driver, a mini-filter, a file system filter driver or a user-mode hooking mechanism. The graphics driver 320, in some embodiments, can be a kernel mode hooking mechanism, e.g. a kernel mode driver, for intercepting two or three-dimensional draw commands and forwarding the intercepted commands to a GPU 305 for rendering or to another virtual machine 232. In one embodiment, the graphics driver 320 can be executed by a guest operating system 230 or within the context of a guest operating system 230. The graphics driver 320 can communicate with other virtual machines 232 or components executing on other virtual machines 232 via an intra-virtual-machine network or other intra-virtualization-environment messaging system. While FIG. 3 illustrates a single graphics driver 320 included in each virtual machine 232, in other embodiments the virtual machines 232 can include any number of graphics drivers.

In one embodiment, the graphics driver 320 can intercept two or three-dimensional draw commands generated or issued by three-dimensional applications 330. In other embodiments, the graphics driver 320 can intercept two or three-dimensional draw commands generated or issued by any application executing on the virtual machine 232 included the guest operating system 230. The graphics driver 320, in still other embodiments, can retrieve two or three-dimensional draw commands from a storage repository or buffer. The graphics driver 320 can execute in a user or kernel mode.

The virtual machines 232 can execute any number of three-dimensional applications 330. The three-dimensional application 330 can be any application that generates three-dimensional draw commands. This application output can include any combination of bitmaps, images, and drawing directives. In some embodiments, the three-dimensional application 330 can generate three-dimensional draw commands able to be interpreted by any of the following graphics libraries: RECT3D; OGRE; OPENGL; QUESA; TEDDY3D; MESA3D; or any other graphics library that can be used to render two or three-dimensional images. While FIG. 3 illustrates three-dimensional applications 330, the applications 330 can generate both three-dimensional and two-dimensional draw commands. In other embodiments, the virtual machines 232 can further execute two-dimensional applications.

In some embodiments, the three-dimensional applications 330 can communicate with the graphics driver, rendering agent 315 and remoting agent 325. The three-dimensional applications 330 can communicate with the graphics driver 320 to forward or transmit draw commands to the graphics driver 320. In other embodiments, the graphics driver 320 can intercept draw commands generated by the three-dimensional application 330. The rendering agent 315, in some embodiments, can function similarly to the graphics driver 320 such that the rendering agent 315 can intercept draw commands generated by the three-dimensional applications 330. In other embodiments, the rendering agent 315 can forward rendered images to the three-dimensional application 330 for display within the context of the application's output window. The remoting agent 325 can communicate with the three-dimensional application 330 to forward user commands to the application 330, and intercept draw commands for transmission to a remote computer 340.

In some embodiments, the three-dimensional application 330 is a component of an operating system. In other embodiments, the three-dimensional application 330 is the guest operating system 230. The three-dimensional application 330, in one embodiment, is a windows manager in the WINDOWS VISTA operating system and uses Direct3D commands to render desktop graphics. in some embodiments, the three-dimensional application 330 generates commands according to an applications programming interface (such as, by way of example, and without limitation, a Direct3D API.) In another embodiment, the application 330 transmits the command to a user-mode runtime component (such as a dynamically linked library component within an operating system.) In still another embodiment, the user-mode runtime component transmits the command to a user-mode graphics processing unit driver (e.g., a software application for transmitting commands to a physical graphics card). In still even another embodiment, the user-mode graphics processing unit driver transmits the command to a kernel-mode runtime component (such as another dynamically linked library component within the operating system). In yet another embodiment, the kernel-mode runtime component transmits the command directly or indirectly to the GPU 305. For example, the kernel-mode runtime component may transmit the card to a miniport driver for forwarding to the GPU 305 or to the hypervisor 202 for modification prior to forwarding to the GPU 305.

The virtual machines 232 can further execute a rendering agent 315. In some embodiments, the guest operating system 230 executes the rendering agent 315, in other embodiments the rendering agent 315 executes within the context of the guest operating system 230. The rendering agent 315, in some embodiments, can receive draw commands from a remote virtual machine and forward those draw commands to the GPU 305 for rendering. For example, the rendering agent 315 can execute on virtual machine A 232B and receive draw commands from virtual machine B 232C. These draw commands can be generated by an application, e.g. a three-dimensional application 330, executing on virtual machine B 232C. In some embodiments, the graphics driver 320 or another application intercepts the draw commands generated by an application executing on virtual machine B 232C and forwards the draw commands to the rendering agent 315 executing on virtual machine A 232B. Upon receiving the draw commands from the remote virtual machine, e.g. virtual machine B 232C, the rendering agent 315 can transmit or forward the draw commands to the GPU 305 for rendering. In some embodiments, the rendering agent 315 can forward the draw commands together with an instruction instructing the GPU 305 to render an image or image file from the accompanying draw commands. In still other embodiments, the rendering agent 315 can store the draw commands in a buffer or storage repository and transmit the draw commands to the GPU 305 when the GPU 305 is available.

In one embodiment, the control virtual machine 232 or another virtual machine designated as a dedicated rendering virtual machine can be given exclusive and direct access to the GPU 305. In that embodiment, an input/output memory management unit (IOMMU) can be used to manage access to the GPU 305. An IOMMU can be an application, hardware component or combination application/hardware component that communicates with the hypervisor 202 to further virtualize access to the physical hardware included in the hardware layer 210. In some embodiments, the hypervisor 202 can communicate with the IOMMU before transmitting draw commands and instructions to the GPU 305. Exemplary communication includes instructions to modify a destination physical memory addresses responsive to communications with the IOMMU.

In some embodiments, the system illustrated in FIG. 3 can be used to render three-dimensional images from three-dimensional drawing or draw commands. In other embodiments, the system illustrated in FIG. 3 can be used to render two-dimensional images from two-dimensional drawing or draw commands.

Figure 4A:
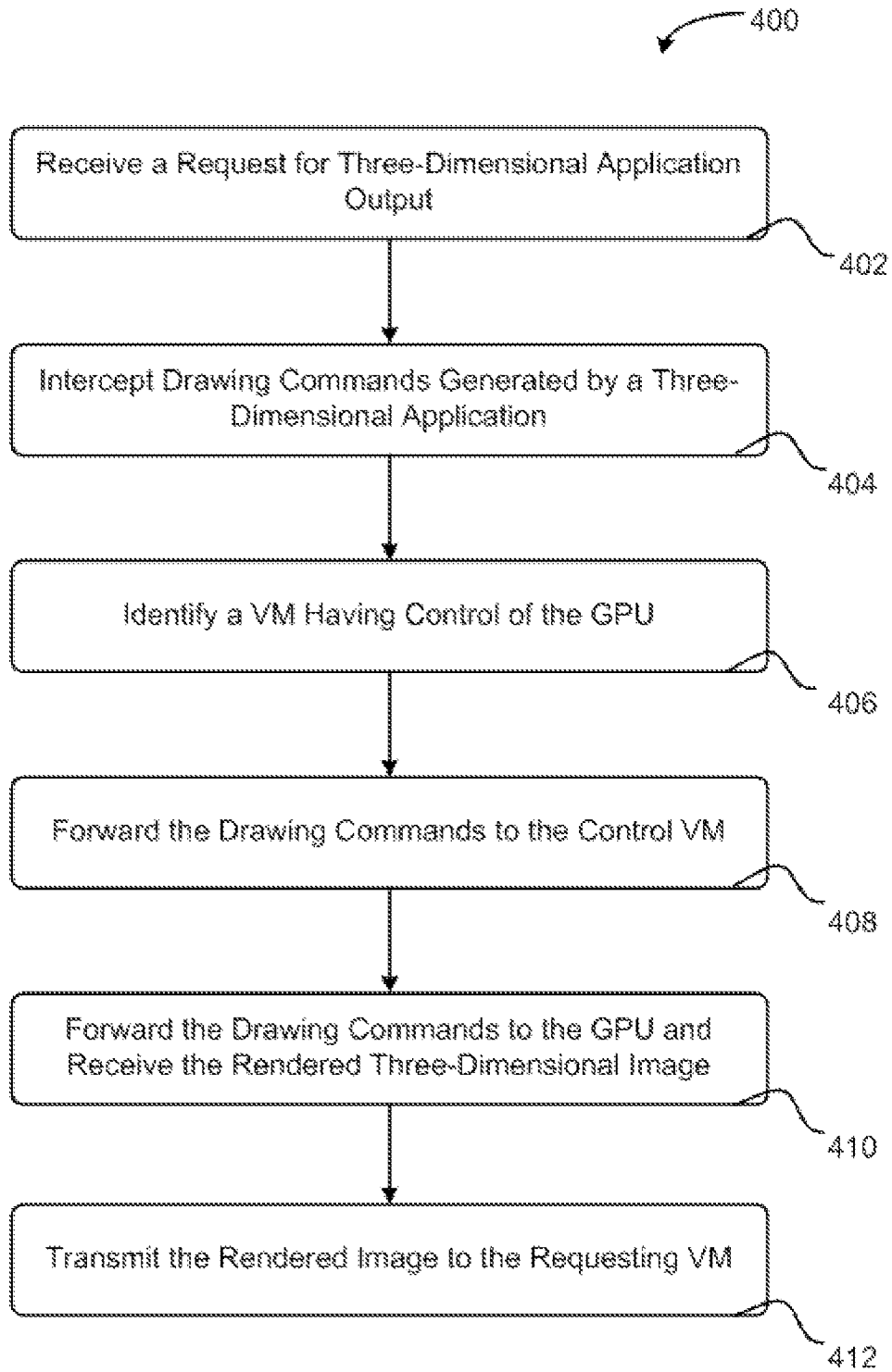
FIGS. 4A-4B are flow diagrams that depict embodiments of methods for remoting three-dimensional images using virtual machines.

Illustrated in FIG. 4A is a method 400 for rendering a three-dimensional image using virtual machines. In one embodiment, a virtual machine 232 or remoting agent 325 executing on a virtual machine 232 receives a request for three-dimensional application output (Step 402). The resulting three-dimensional draw commands generated by the three-dimensional application are intercepted by a graphics driver 320 (Step 404). Upon determining that the virtual machine 232 does not have permission to access the GPU 305, the graphics driver 320 identifies a rendering agent 315 or virtual machine 232 having control of the GPU 305 (Step 406), and forwards the intercepted draw commands to a rendering agent 315 executing on the identified virtual machine 232 (Step 408). The rendering agent 315 forwards the draw commands to the GPU 305, receives the rendered image from the GPU 305 (Step 410) and forwards the rendered image to the requesting virtual machine (Step 412).

Further referring to FIG. 4A, and in more detail, in one embodiment a virtual machine 232 receives a request or three-dimensional application output (Step 402). In some instances this request can be generated by a user of a remote computer 340, or an application executing on the remote computer 340. A remoting application 335 executing on a remote computer 340 can forward the request to the virtual machine 232, or in some embodiments can issue the request in response to receiving a request for application output. The request, in some embodiments, can include: an identifier that identifies the application that generates the requested application output; a virtual channel and/or a destination address for the remote computer 340; a user identifier; or any other information that can be used to determine what application output should be transmitted to the requesting computer. While in some embodiments the virtual machine 232 receives the request, in other embodiments a remoting agent 325 executing on the virtual machine 232 receives the request. Still other embodiments include any application or object on the virtual machine 232 able to receive the request.

In response to receiving the request for application output, the virtual machine 232 or remoting agent 325 can request the graphics output of the three-dimensional application identified in the request. In some embodiments, requesting the graphics output can include requesting the three-dimensional images from a desktop manager or other application that manages the rendering of desktop images. In response to a request for graphics output, a graphics driver 320 may intercept three-dimensional draw commands generated by the application (Step 404). Intercepting the three-dimensional draw commands can include hooking into a call made by the application to a GPU 305, or hooking into a call made by the application to the guest operating system 230 to render the draw commands generated by the application. In some embodiments, the request for application output can be a request for application output already generated by an application. In these embodiments, the virtual machine 232 or remoting agent 325 can retrieve the three dimensional draw commands from a graphics buffer or other storage repository storing draw commands and images generated by the application identified in the request.

Upon intercepting the draw or drawing commands generated by the application 330, the graphics driver 320 can identify a rendering agent 325 or virtual machine 232 that has control over the GPU 305 (Step 406). In some embodiments, the graphics driver 320 can identify a rendering agent 325 or virtual machine 232 having control of the GPU 305 by receiving a notification in response to requesting access to the GPU 305. In other embodiments, the graphics driver 320 can identify a rendering agent 325 or virtual machine 232 having control or direct access to the GPU 305 in response to transmitting draw commands and/or a rendering instruction to the GPU 305. The response or notification can be issued by the hypervisor 202, the control program 220 or another application able to identify the virtual machine 232 or entity that has direct access to the GPU 305 and therefore controls the GPU 305. In some embodiments, the method 400 may not include the step of identifying a rendering agent 315 having direct access to the GPU 305. Instead, the hypervisor 202 or control program 220 can redirect any rendering requests issued by any virtual machine other than the virtual machine having control over the GPU 305 to the virtual machine having control over the GPU 305. In these embodiments, the graphics driver 3320 and/or virtual machine 232 that issued the rendering request may not receive a notification identifying the entity that controls the GPU 305.

In embodiments where the graphics driver 320 obtains information about the virtual machine 232 or rendering agent 315 that controls the GPU 305, the graphics driver 320 can forward the drawing commands to the controlling entity (Step 408). This controlling entity can be a controlling virtual machine 232, a controlling guest operating system 230 or a controlling rendering agent 315. A controlling entity is any entity that has direct access to the GPU 305. In some embodiments, the graphics driver 320 can forward the three-dimensional drawing commands to the controlling entity via a virtual-machine-to-virtual-machine communication protocol. In other embodiments, the graphics driver 320 can forward the drawing commands to the controlling entity using a network. In still other embodiments, the graphics driver 320 may not forward the drawing commands to the controlling entity. In these embodiments, the hypervisor 202 or control program 220 may intercept the rendering request and redirect it to the entity that has control or that has a lock on the GPU 305.

The rendering agent 315 having control over the GPU 305 can receive the rendered image from the GPU 305 (Step 410) and forward the rendered image to the virtual machine that requested the image (Step 412). For example, the virtual machine 232B that has direct access to the GPU 305, e.g. the controlling entity, can receive the rendered image from the GPU 305 once the GPU 305 has rendered the image from the drawing commands generated by an application executing on the virtual machine 232C that does not have direct access to the GPU 305, e.g. a non-controlling entity. In some instances a rendering agent 315 executing on the control virtual machine 232B retrieves the rendered image from a buffer to which the GPU 305 wrote or saved the rendered image. Upon receiving or retrieving the rendered image, the control virtual machine 232B a rendering agent 315 executing on the control virtual machine 232B or another application executing on the control virtual machine 232B can transmit the rendered image to the non-controlling virtual machine 232C executing the application that generated the drawing commands from which the image was rendered.

In some embodiments, the method 400 can further include transmitting the rendered image from the non-controlling virtual machine 232C to a remote computer 340 that requested the application output represented by the rendered image. In these embodiments, the rendered image represents an image generated from draw commands generated by an application executing on the non-controlling virtual machine. Thus, the rendered image represents the application output requested by the remote computer 340. The non-controlling virtual machine 232 or a remoting agent 325 executing on the non-controlling virtual machine can transmit the rendered image to the remote computer 340 in response to the remote computer's request for application output. In some embodiments, the rendered image can be transmitted over a virtual channel established between the computer 201 and remote computer 340. Thus, the application output is generated by an application 330B executing on the non-controlling virtual machine 232C, transmitted to a rendering agent 315A executing on the controlling virtual machine 232B, rendered by the GPU 305 to generate an image, the rendered image is transmitted back to the non-controlling virtual machine 232C and the rendered image is forwarded to the remote computer 340.

Figure 4B:
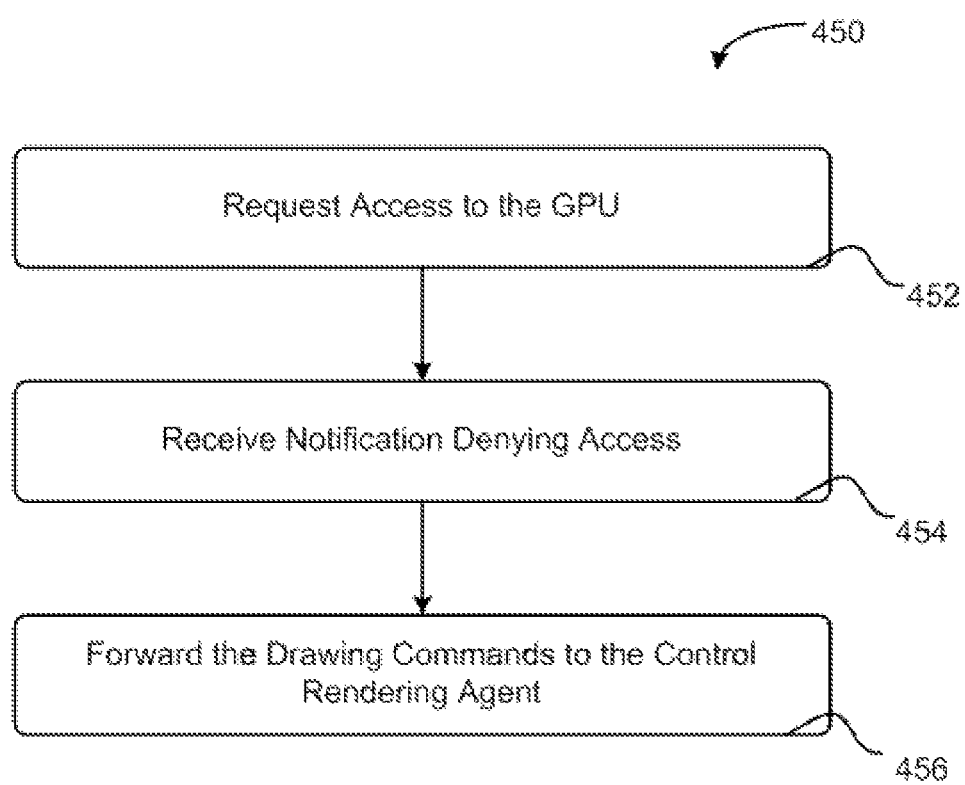

Illustrated in FIG. 4B is one embodiment of a method 450 for requesting access to the GPU 305. In this method 450, a graphics driver 320 or virtual machine 232 can request to access the GPU 305 (Step 452). When it is determined that another entity has a lock on the GPU 305, the requesting entity can receive a notification denying access to the GPU 305 (Step 454). The requesting entity can then forward the drawing commands to the rendering agent 315 (Step 456).

Further referring to FIG. 4B, and in more detail, in one embodiment a graphics driver 320, a virtual machine 232, a guest operating system 230 or an application 330 can request access to the GPU 305 (Step 452). Requesting access to the GPU 305 can include sending drawing commands (e.g. two-dimensional or three-dimensional draw commands) to the GPU 305 for rendering. This request can further include an instruction to render the transmitted draw commands. In other embodiments, the request can include a request to access the GPU 305 and transmit draw commands to the GPU 305 for rendering. In still other embodiments, the request can be a request to obtain a lock on the GPU 305 so that the requesting entity can control and exclusively access the GPU 305. A request to access the GPU 305, in some embodiments, can be received by a hypervisor 202, a control program 220 or any other application or object able to manage access to the GPU 305. In some embodiments, the request can include a virtual machine identifier, a user identifier, or information about the type of drawing commands to be forwarded to the GPU 305 for rendering (e.g. metadata indicating three-dimensional rendering will be requested.)

The requesting entity (e.g. the graphics driver 320, virtual machine 232, guest operating system 230 or application 330) can receive a response or notification denying access to the GPU 305 (Step 454). In some embodiments, the requesting entity may not receive a notification denying access, but rather the hypervisor 202 or control program 220 may deny access and forward the draw commands to an entity that has a lock on the GPU 305. In these embodiments, the requesting entity may not receive a notification that the requesting entity was denied access. Instead any draw commands forwarded to the GPU 305 by the requesting entity are redirected to a virtual machine 232 that has direct access, e.g. control, over the GPU 305. In one embodiment, the denial notification can include the address, identifier or name of the entity that has a lock on the GPU 305. In other embodiments, the denial notification can take the form of an error message indicating that the GPU 305 is not available. In some embodiments, the virtualization environment may be configured to provide a control virtual machine 232A with exclusive access to the GPU 305. In these embodiments, any rendering request issued by a virtual machine 232B-232D that is not the control virtual machine 232A, may be redirected to a rendering agent 315 or other application executing on the control virtual machine 232A. Other applications can include the control program 220 or a graphics driver 320 executing on the control virtual machine 232A. In these embodiments, the control virtual machine 232A can be characterized as any virtual machine 232 executing a control program 220 that manages other virtual machines 232 within the virtualization environment 302.

Upon receiving the denial notification, the requesting entity can forward the draw commands to the entity that has a lock on the GPU 305 (Step 456). In some embodiments, this entity can be a rendering agent 315 that has control over the GPU 305. Control over the GPU 305 can include having direct and exclusive access to the GPU 305. In other embodiments, the requesting entity can forward the draw commands to the rendering agent 315 of the virtual machine 232 that has control over the GPU 305.

Figure 5A:
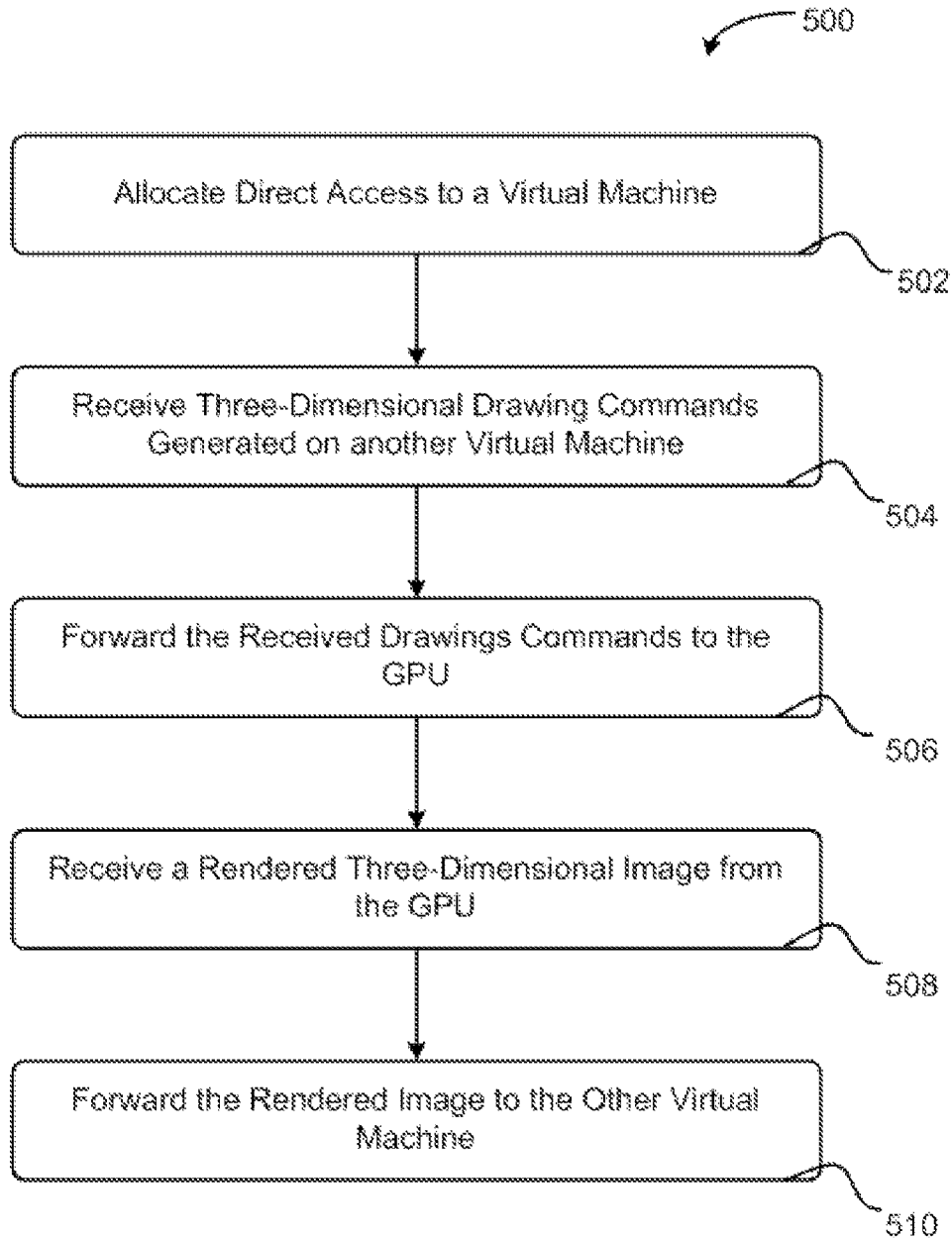
FIGS. 5A-5B are flow diagrams that depict embodiments of methods for allocating direct access to a graphics processing unit to a virtual machine.

Illustrated in FIG. 5A is one embodiment of a method 500 for allocating access to a GPU 305 to a virtual machine 232. A hypervisor 202 or control program 220 allocates direct access to a GPU 305 to a virtual machine 232 (Step 502). A rendering agent 315 receives draw commands (e.g. two-dimensional or three-dimensional) from another virtual machine 232 (Step 504) and forwards those draw commands to the GPU 305 (Step 506). The rendering agent 315 then receives a rendered image from the GPU 305 (Step 508) and forwards the rendered image to the virtual machine 232 (Step 510).

Further referring to FIG. 5A, and in more detail, in some embodiments a hypervisor 202 can allocate direct access to a GPU 305 to a virtual machine 232 (Step 502). While in some embodiments, the hypervisor 202 can allocate direct access in other embodiments a control program 220 can allocate direct access. The access to the GPU 305 can be allocated or given to a virtual machine 232, a rendering agent 315 executing on a particular virtual machine 232, a graphics driver 320 executing on a particular virtual machine 232 or any other application or object executing on a particular virtual machine 232. In some embodiments, direct access can include exclusive access to the GPU 305 such that the GPU 305 renders only draw commands generated by applications 330 or operating systems 230 executing on the virtual machine 232 allocated direct access to the GPU 305. Exclusive access can include preventing other virtual machines 232 from accessing the GPU 305 and having the GPU 305 render images from draw commands generated by those other virtual machines 232.

The rendering agent 315 executing on the virtual machine 232 that was given direct access to the GPU 305 (e.g. the control rendering agent 315) can receive draw commands from other virtual machines 232 (Step 504). These draw commands can be generated by applications 330 or operating systems 230 executing on other virtual machines 232 (e.g. virtual machines not given control or direct access to the GPU 305). In some embodiments, a graphics driver 320 or rendering agent 315 executing on the other virtual machines 232 can forward the draw commands to the control rendering agent 315. The commands may be forwarded to the control rendering agent 315 for rendering.

Upon receiving the draw commands, the control rendering agent 315 can forward the received draw commands to the GPU 305 (Step 506). In some embodiments, the rendering agent 315 can just forward the draw commands, in other embodiments the control rendering agent 315 can forward the draw commands together with an instruction to render the GPU 305. Upon receiving the draw commands and/or the rendering instruction, the GPU 305 can render an image from the draw commands. In some embodiments the GPU 305 can send the control rendering agent 315 the rendered image. In other embodiments, the GPU 305 can store the rendered image in a buffer or other storage repository.

The rendering agent 315 can then receive the rendered image from the GPU 305 (Step 508). In some embodiments, the control rendering agent 315 can retrieve the rendered image from a buffer or other storage repository. Upon receiving the rendered image, the control rendering agent 315 can forward the rendered image to the virtual machine 232 that forwarded the draw commands (Step 510).

Figure 5B:
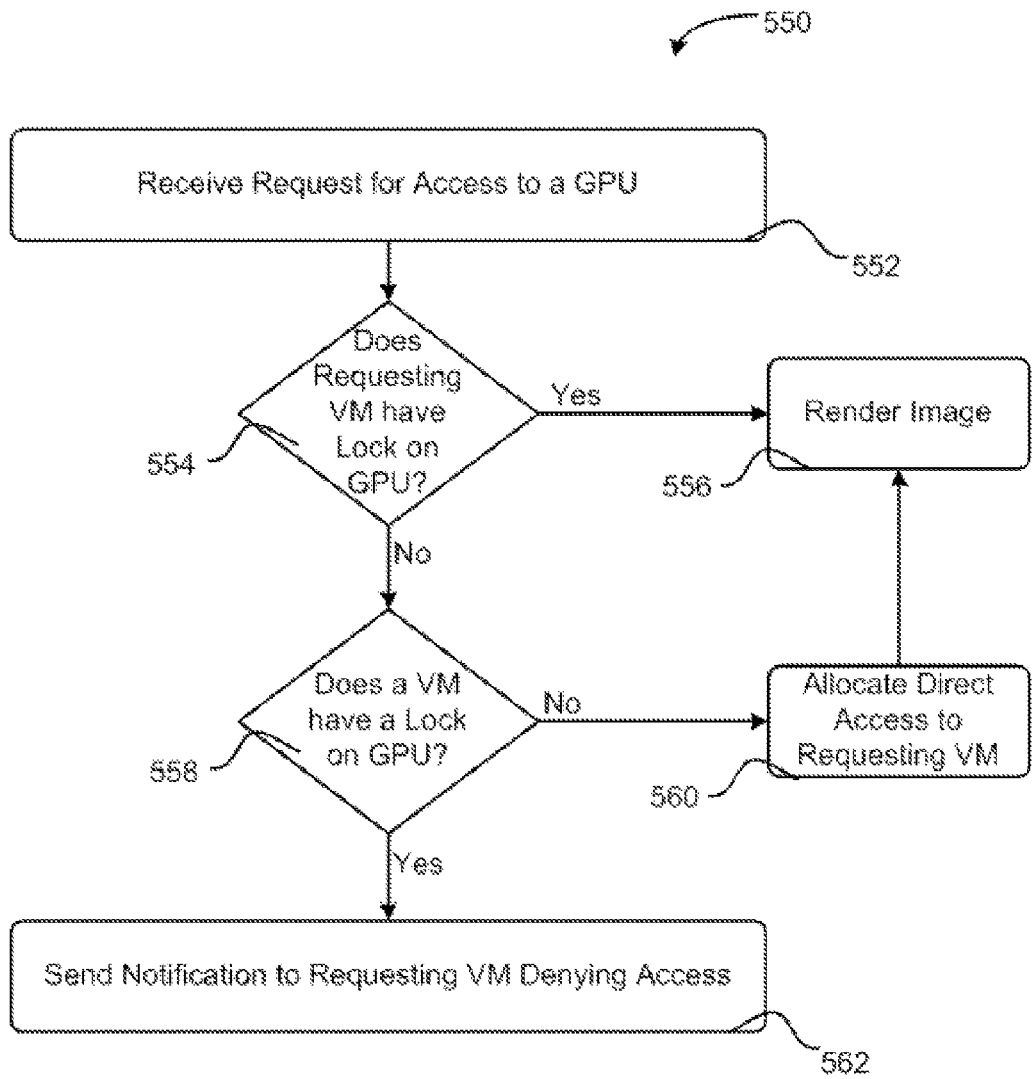

Illustrated in FIG. 5B is one embodiment of a method 550 for allocating direct access to the GPU 305 to a requesting entity. A hypervisor 202 or control program 220 receives a request from a virtual machine 232, rendering agent 315 or graphics driver 320 for access to the GPU 305 (Step 552). A decision is then made as to whether the requesting virtual machine 232 (or requesting entity executing on a virtual machine) has a lock on the GPU 305 (Step 554). This decision can be made by the hypervisor 202 or the control program 220. When it is decided that the requesting virtual machine 232 has a lock, the hypervisor 202 or control program 220 permits the GPU 305 to render the image (Step 556). When it is determined that the requesting virtual machine 232 does not have a lock on the GPU 305, the hypervisor 202 or control program 220 further determines whether there exists a virtual machine 232 that has a lock on the GPU 305 (Step 558). When it is determined that there does exist another virtual machine 232 (i.e. other than the requesting virtual machine) that has a lock on the GPU 305, then the hypervisor 202 or control program 220 sends a notification to the requesting virtual machine 232 denying access to the GPU 305 (Step 562). When it is determined that there does not exist another virtual machine 232 that has a lock on the GPU 305, the hypervisor 202 or control program 220 can allocate direct and exclusive access to the GPU 305 to the requesting virtual machine 232 (Step 560), and the GPU 305 can render an image from the draw commands forwarded by the requesting virtual machine 232 (Step 556).

One example of using virtual machines to render three-dimensional draw commands generated by an application can include allocating access to the GPU 305 to a control virtual machine 232B. The control virtual machine can be a control virtual machine 232A executing a control program 220 or another virtual machine 232B. The hypervisor 202 can allocate access to the GPU 305, where the GPU 305 resides on the same physical computer 201 that executes the control virtual machine 232B. In some embodiments, the control virtual machine 232B can execute a non-paravirtualized operating system 230. An agent or graphics driver 320 executing on another virtual machine 232C, e.g. a virtual machine 232C that doesn't have direct access to the GPU 305, intercepts three-dimensional draw commands generated by an application 330B executing on the non-control virtual machine 232C. In some embodiments, the agent 320B can directly forward the three-dimensional draw commands to a rendering agent 315A executing on the control virtual machine 232B. In other embodiments the agent 320B can request access to the GPU 305 and upon receiving a notification denying access to the GPU 305, the agent 320B can redirect the three-dimensional draw commands to the rendering agent 315A. Upon receiving the three-dimensional draw commands, the rendering agent 315A can forward the commands to the GPU 305 which can generate an image from the three-dimensional draw commands upon receiving the commands. In some embodiments, the GPU 305 can transmit the rendered image to the rendering agent 315A, in other embodiments the rendering agent 315A can retrieve the image from a buffer. Upon retrieving or receiving the rendered image, the rendering agent 315A can forward the rendered image to the agent 320B executing on the non-control virtual machine 232C. The non-control virtual machine 232C, in response to receiving the rendered image, can transmit the rendered image to a remote, physical computer 340 over a communication channel established over a network connecting the computer 201 and remote computer 340. In this example, the agent 320B can be a graphics driver or another application executing on the non-control virtual machine 232C. Another application could be a redirection agent or hooking application able to intercept drawing commands generated by applications executing on the virtual machine 232C.

While certain exemplary embodiments have been described and shown in the accompanying drawings, it is to be understood that such embodiments are merely illustrative of and not restrictive on the methods and systems described herein. Additionally, it is possible to implement the methods and systems described herein or some of its features in hardware, programmable devices, firmware, software or a combination thereof. The methods and systems described herein or parts of the methods and systems described herein may also be embodied in a processor-readable storage medium or machine-readable medium such as a magnetic (e.g., hard drive, floppy drive), optical (e.g., compact disk, digital versatile disk, etc), or semiconductor storage medium (volatile and non-volatile).

What is claimed is:
1. A method for rendering draw commands generated by an application, the method comprising:
   intercepting, by an agent executing on a first virtual machine, draw commands generated by an application on the first virtual machine;

receiving, by the agent, a notification denying the agent access to a graphics processing unit, the notification identifying a second virtual machine allocated with the graphics processing unit;

redirecting, by the agent, the intercepted draw commands to a rendering agent on the second virtual machine;

rendering, by the graphics processing unit, an image based on the redirected draw commands; and forwarding, by the rendering agent on the second virtual machine, the rendered image from the graphics processing unit to the agent executing on the first virtual machine.

2. The method of claim 1, wherein intercepting the draw commands comprises intercepting three-dimensional draw commands generated by the application on the first virtual machine, the first virtual machine executing a non-paravirtualized operating system.

3. The method of claim 1, further comprising transmitting, from the first virtual machine responsive to receiving the rendered image from the rendering agent, the rendered image to a second physical computer over a communication channel established between the second physical computer and a first physical computer hosting the first virtual machine.

4. The method of claim 3, wherein transmitting the rendered image to the second physical computer further comprises transmitting, by a remoting agent executing on the first virtual machine, the rendered image to the second physical computer.

5. The method of claim 1, further comprising transmitting, by the rendering agent responsive to receiving the redirected draw commands, the redirected draw commands to the graphics processing unit.

6. The method of claim 1, further comprising receiving, by the first virtual machine, a request from a second physical computer for application output generated by the application executing on the first virtual machine.

7. The method of claim 6, further comprising transmitting the rendered image to the second physical computer in response to receiving the request from the second physical computer.

8. The method of claim 1, further comprising allocating to the second virtual machine, by a hypervisor executing on a first physical computer executing the first virtual machine and the second virtual machine, direct access to the graphics processing unit of the first physical computer.

9. The method of claim 1, further comprising requesting, by the agent, access to the graphics processing unit responsive to intercepting the draw commands.

10. The method of claim 1, wherein redirecting the intercepted draw commands further comprises redirecting the intercepted draw commands responsive to receiving the notification, the notification comprising a message from a hypervisor denying the first virtual machine access to the graphics processing unit.

11. A system for remotely rendering draw commands generated by an application, the system comprising:

a graphics processing unit; and an agent executing on a first virtual machine of a first physical computer, the agent configured to:
intercept draw commands generated by an application executing on the first virtual machine;
receive a notification denying the agent access to the graphics processing unit, the notification identifying a second virtual machine allocated with the graphics processing unit; and
redirect the intercepted draw commands to a rendering agent on the second virtual machine;

wherein the graphics processing unit is configured to render an image based on the redirected draw commands, and the rendering agent is configured to forward the rendered image from the graphics processing unit to the agent executing on the first virtual machine.

12. The system of claim 11, wherein the agent is configured to intercept three-dimensional draw commands generated by the application on the first virtual machine, the first virtual machine executing a non-paravirtualized operating system.

13. The system of claim 11, further comprising a remoting agent executing on the first virtual machine, the remoting agent configured to transmit, responsive to receiving the rendered image from the rendering agent, the rendered image to a second physical computer over a communication channel established between the second physical computer and the first physical computer.

14. The system of claim 13, wherein the remoting agent is configured to transmit the rendered image to the second physical computer responsive to receiving the rendered image from the rendering agent.

15. The system of claim 11, wherein the rendering agent is configured to transmit the draw commands to the graphics processing unit responsive to receiving the draw commands from the agent.

16. The system of claim 11, wherein the first virtual machine receives a request from a second physical computer for application output generated by the application executing on the first virtual machine.

17. The system of claim 16, further comprising a remoting agent executing on the first virtual machine, the remoting agent configured to transmit the rendered image to the second physical computer in response to receiving the request from the second physical computer.

18. The system of claim 11, further comprising a hypervisor executing on the first physical computer, the hypervisor configured to allocate to the second virtual machine direct access to the graphics processing unit of the first physical computer.

19. The system of claim 11, wherein the agent is further configured to request access to the graphics processing unit responsive to intercepting the draw commands.

20. The system of claim 11, wherein the agent is configured to redirect the intercepted draw commands responsive to receiving the notification, the notification comprising a message from a hypervisor denying the first virtual machine access to the graphics processing unit.

* * * * *